United States Patent
Sato

(10) Patent No.: US 10,864,904 B2
(45) Date of Patent: Dec. 15, 2020

(54) HYBRID VEHICLE

(71) Applicant: TOYOTA JIDOSHA KABUSHIKI KAISHA, Toyota (JP)

(72) Inventor: Keita Sato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 16/174,662

(22) Filed: Oct. 30, 2018

(65) Prior Publication Data

US 2019/0135263 A1    May 9, 2019

(30) Foreign Application Priority Data

Nov. 6, 2017    (JP) ................. 2017-214177

(51) Int. Cl.
| | | |
|---|---|---|
| *B60W 20/10* | (2016.01) | |
| *B60K 6/26* | (2007.10) | |
| *B60W 10/06* | (2006.01) | |
| *B60W 10/08* | (2006.01) | |
| *F02D 41/04* | (2006.01) | |
| *F02B 29/00* | (2006.01) | |

(52) U.S. Cl.
CPC ............ *B60W 20/10* (2013.01); *B60K 6/26* (2013.01); *B60W 10/06* (2013.01); *B60W 10/08* (2013.01); *F02B 29/00* (2013.01); *F02D 41/042* (2013.01); *B60W 2510/0676* (2013.01); *B60W 2555/20* (2020.02); *B60W 2710/06* (2013.01); *B60W 2710/08* (2013.01); *B60Y 2200/92* (2013.01); *B60Y 2300/192* (2013.01); *F02D 2200/021* (2013.01); *F02D 2200/023* (2013.01); *F02D 2250/24* (2013.01)

(58) Field of Classification Search
CPC ...... B60W 20/10; B60W 10/06; B60W 10/08; B60W 20/108; B60K 6/26; B60L 50/62; Y02T 10/6286
See application file for complete search history.

(56) References Cited

U.S. PATENT DOCUMENTS

| | | | | |
|---|---|---|---|---|
| 2013/0297138 | A1* | 11/2013 | Fushiki | B60K 6/445 701/22 |
| 2015/0051770 | A1* | 2/2015 | Hayashi | B60W 20/20 701/22 |

FOREIGN PATENT DOCUMENTS

| | | | | |
|---|---|---|---|---|
| JP | 2008-080914 A | | 4/2008 | |
| JP | 2008080914 A | * | 4/2008 | .............. B60L 50/62 |
| JP | 2014-172540 A | | 9/2014 | |
| JP | 2014-184940 A | | 10/2014 | |

OTHER PUBLICATIONS

English Machine Translation of JP2008080914A (Year: 2008).*

* cited by examiner

*Primary Examiner* — Anne Marie Antonucci
*Assistant Examiner* — Andrew J Cromer
(74) *Attorney, Agent, or Firm* — Sughrue Mion, PLLC

(57) ABSTRACT

On satisfaction of conditions to shift to scavenging control in response to a stop request of an engine, a hybrid vehicle performs engine power limitation control that limits the power output from the engine with an engine upper limit power as an upper limit.

10 Claims, 18 Drawing Sheets

HYBRID VEHICLE

CROSS-REFERENCE TO RELATED APPLICATION

This application claims priority to Japanese Patent Application No. 2017-214177 filed on Nov. 6, 2017, the contents of which is incorporated herein by reference.

TECHNICAL FIELD

The present disclosure relates to a hybrid vehicle.

BACKGROUND

In a hybrid vehicle equipped with an engine and a generator that is connected with an output shaft of the engine, a proposed configuration performs scavenging of a combustion chamber in the engine and subsequently stops the engine, in response to an ignition off prior to completion of warm-up of the engine that is started in a cold time (as described in, for example, JP 2008-80914A). This hybrid vehicle causes the generator to motor the engine at a predetermined rotation speed over a predetermined time period prior to a stop of the engine and accordingly achieves scavenging of the combustion chamber. This is expected to effectively remove water in the combustion chamber and prevent accumulation of water on an ignition plug, so as to prevent deterioration of the engine startability.

CITATION LIST

Patent Literature

PTL 1: JP2008-80914A

SUMMARY

A drive system including a generator and a mechanical mechanism has a natural resonance frequency band. When the rotation speed of the engine enters the resonance frequency band, resonance occurs in the drive system due to torque pulsation of the engine. There is accordingly a need to fully take into account this likelihood when the engine is motored.

A hybrid vehicle of the present disclosure mainly aims to suppress the occurrence of resonance and suppress vibration or the like of the vehicle when fuel supply to an engine is cut off and the engine is motored from a state that the engine is operated.

In order to achieve the above primary object, the hybrid vehicle of the disclosure is implemented by an aspect described below.

According to one aspect of the present disclosure, there is provided a hybrid vehicle including an engine, a motor generator configured to regenerate power from the engine and to motor the engine, and a control device configured to control the engine and the motor generator. The control device performs motoring control that controls the motor generator to cut off fuel supply to the engine and to motor the engine from a state that the engine is operated. When the engine is to be stopped after the motoring control, the control device causes the engine to be motored at a rotation speed that exceeds a rotation speed range of the engine causing resonance, as the motoring control.

The hybrid vehicle of this aspect performs the motoring control that controls the motor generator to cut off fuel supply to the engine and to motor the engine from the state that the engine is operated. When the engine is to be stopped after the motoring control, the control device causes the engine to be motored at the rotation speed that exceeds the rotation speed range of the engine causing resonance (resonance band), as the motoring control. This configuration prevents the engine rotation speed from entering the resonance band during the motoring control. This accordingly suppresses the occurrence of resonance and suppresses vibration or the like of the vehicle.

DESCRIPTION OF EMBODIMENTS

The following describes aspects of the present disclosure with reference to some embodiments.

EMBODIMENTS

First Embodiment

Figure 1:
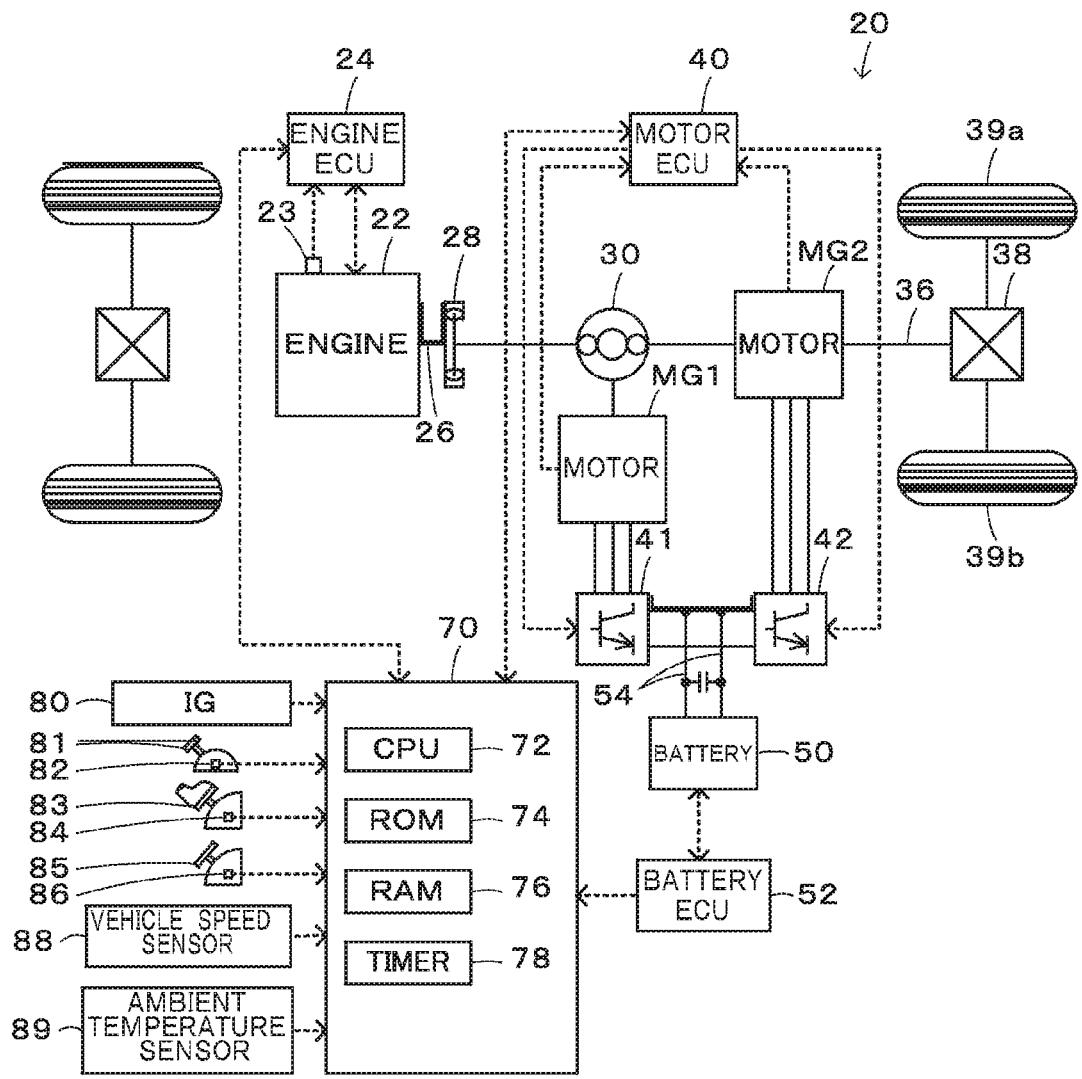
FIG. 1 is a configuration diagram schematically illustrating the configuration of a hybrid vehicle 20 according to one embodiment of the present disclosure.

FIG. 1 is a configuration diagram schematically illustrating the configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50, and a hybrid electronic control unit (hereinafter may be referred as "HVECU") 70.

Figure 2:
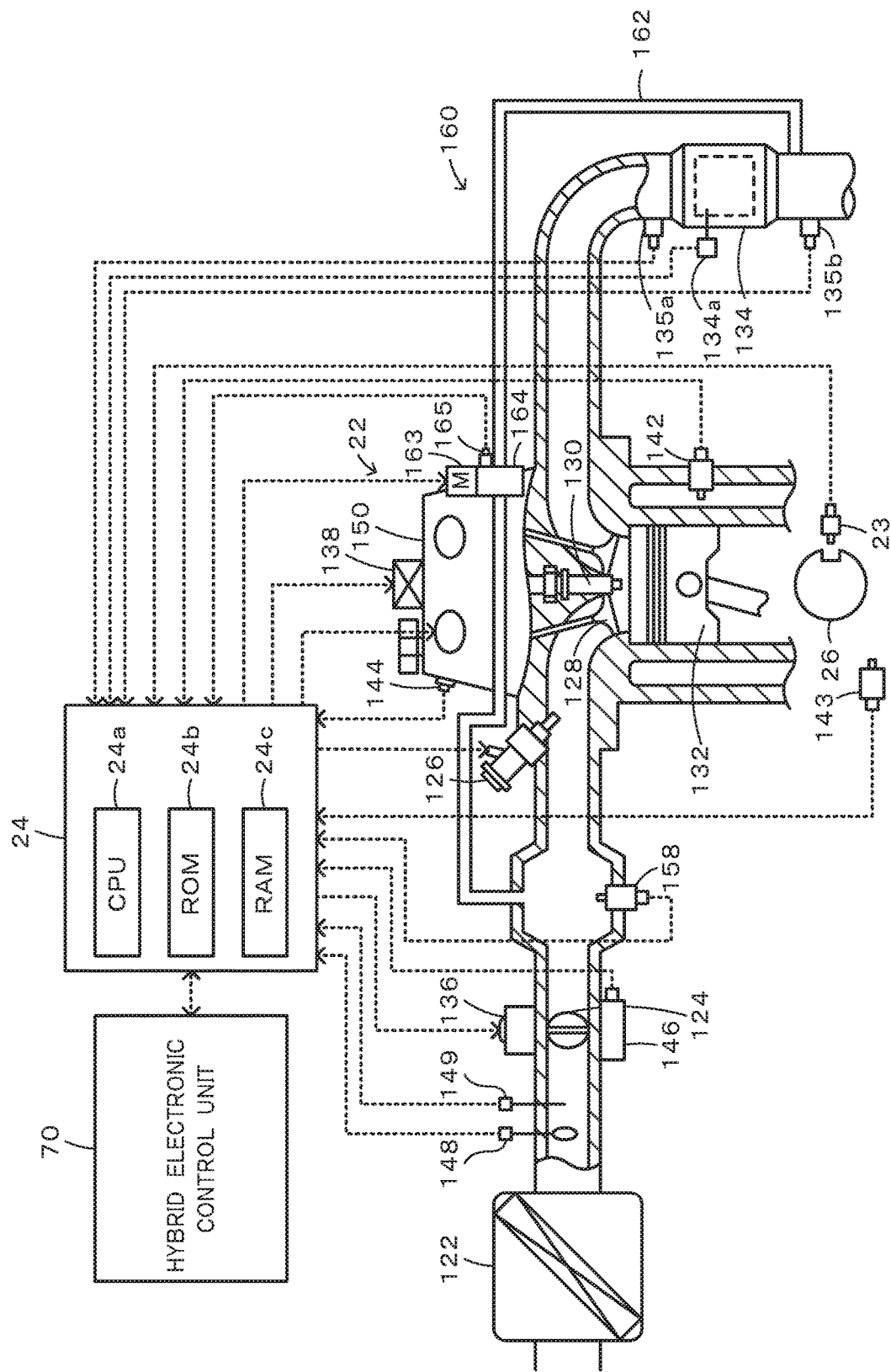
FIG. 2 is a configuration diagram schematically illustrating the configuration of an engine 22.

The engine 22 is configured as an internal combustion engine that outputs power by combustion of a hydrocarbon fuel such as gasoline or light oil. As shown in FIG. 2, the engine 22 is configured to mix the air that is cleaned by an air cleaner 122 and that is taken in via a throttle valve 124 with gasoline that is injected from a fuel injection valve 126, to take in the air-fuel mixture of the intake air and gasoline to a combustion chamber via an intake valve 128 and explosively combust the air-fuel mixture with an electric spark provided by a spark plug 130, and to convert the reciprocating motion of a piston 132 that is pressed down by the energy of the explosive combustion, into rotating motion of a crankshaft 26. The exhaust gas from the engine 22 is discharged to the outside air through an exhaust emission control device 134 that is filled with an exhaust catalyst (three-way catalyst) serving to convert toxic components such as carbon monoxide (CO), hydrocarbons (HC) and nitrogen oxides (NOx) and is supplied to the air intake side via an exhaust gas recirculation system (hereinafter referred to as "EGR system") 160 arranged to recirculate the exhaust gas into the intake air. The EGR system 160 includes an EGR pipe 162 connected after the exhaust emission control device 134 to supply the exhaust gas to an air intake-side surge tank, and an EGR valve 164 placed in the EGR pipe 162 and driven by a stepping motor 163. The EGR system 160 serves to regulate the recirculation amount of the exhaust gas as non-combusted gas by adjusting the opening position of the EGR valve 164 and recirculate the regulated amount of the exhaust gas to the air intake side. According to the embodiment, the engine 22 is configured as a gasoline engine to output power using gasoline as the fuel. According to a modification, the engine 22 may be configured as a diesel engine to output power using light oil as the fuel.

The engine 22 is operated and controlled by an engine electronic control unit (hereinafter referred to as "engine ECU") 24. The engine ECU 24 is configured as a CPU 24a-based microprocessor and includes a ROM 24b configured to store processing programs, a RAM 24c configured to temporarily store data, input/output ports (not shown) and a communication port (not shown), in addition to the CPU 24a, although not being illustrated. Signals from various sensors provided to detect the conditions of the engine 22 are input into the engine ECU 24 via the input port. The input signals include, for example, a crank position from a crank position sensor 23 configured to detect the rotational position of the crankshaft 26, an engine water temperature Thw from a water temperature sensor 142 configured to detect the temperature of cooling water in the engine 22, and an engine oil temperature Thoi from an oil temperature sensor 143 configured to detect the temperature of engine oil. The input signals also include cam positions from a cam position sensor 144 configured to detect the rotational positions of cam shafts provided to respectively open and close the intake valve 128 and an exhaust valve that respectively serve for the air intake and exhaust into and from the combustion chamber. Additionally, the input signals include a throttle position TH from a throttle valve position sensor 146 configured to detect the position of the throttle valve 124, an intake air flow Qa from an air flowmeter 148 mounted to an intake pipe, an intake air temperature Ta from a temperature sensor 149 mounted to the intake pipe, and an intake air pressure Pin from an intake air pressure sensor 158 configured to detect the internal pressure of the intake pipe. Furthermore, the input signals include a catalyst temperature Tc from a temperature sensor 134a mounted to the exhaust emission control device 134, an air-fuel ratio AF from an air-fuel ratio sensor 135a, an oxygen signal O2 from an oxygen sensor 135b, and an EGR valve position EV from an EGR valve position sensor 165 configured to detect the opening position of the EGR valve 164. Various control signals for driving the engine 22 are output from the engine ECU 24 via the output port. The output signals include, for example, a driving signal to the fuel injection valve 126, a driving signal to a throttle motor 136 configured to adjust the position of the throttle valve 124, a control signal to an ignition coil 138 integrated with an igniter, a control signal to a variable valve timing mechanism 150 configured to change the open-close timing of the intake valve 128 and a driving signal to the stepping motor 163 configured to adjust the opening position of the EGR valve 164. The engine ECU 24 communicates with the hybrid electronic control unit 70 to control the operations of the engine 22 in response to control signals from the hybrid electronic control unit 70 and output data regarding the operating conditions of the engine 22 as needed basis. The engine ECU 24 calculates a rotation speed of the crankshaft 26, i.e., a rotation speed Ne of the engine 22, based on the crank position from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are respectively connected with the motors MG1 and MG2 and are also connected with the battery 50 via power lines 54. A motor electronic control unit (hereinafter referred to as "motor ECU") 40 performs switching control of a plurality of switching elements (not shown) included in the respective inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors (not shown) configured to detect the rotational positions of the respective rotors of the motors MG1 and MG2 are input into the motor ECU 40 via the input port. The motor ECU 40 outputs via the output port, for example, switching control signals to the plurality of switching elements (not shown) included in the respective inverters 41 and 42. The motor ECU 40 is connected with the HVECU 70 via the respective communication ports. The motor ECU 40 calculates rotation speeds Nm1 and Nm2 of the motors MG1 and MG2, based on the rotational positions θm1 and θm2 of the respective rotors of the motors MG1 and MG2 input from the rotational position detection sensors.

The battery 50 may be configured as, for example, a lithium ion rechargeable battery or a nickel metal hydride battery and is connected with the inverters 41 and 42 via the power lines 54. This battery 50 is under management of a battery electronic control unit (hereinafter referred to as battery ECU) 52.

The battery ECU 52 is configured as a CPU-based microprocessor and includes a ROM configured to store processing programs, a RAM configured to temporarily store data input/output ports and a communication port, in addition to the CPU, although not being illustrated. The signals input into the battery ECU 52 include, for example, a battery voltage Vb from a voltage sensor (not shown) placed between terminals of the battery 50, a battery current Ib from a current sensor (not shown) mounted to an output terminal of the battery 50, and a battery temperature Tb0 from a temperature sensor (not shown) mounted to the battery 50. The battery ECU 52 is connected with the HVECU 70 via the respective communication ports. The battery ECU 52 calculates a state of charge SOC, based on an integrated value of the battery current Ib input from the current sensor (not shown). The state of charge SOC denotes a ratio of the capacity of electric power dischargeable from the battery 50 to the overall capacity of the battery 50. The battery ECU 52 also sets a charge-discharge required power Pb* as charge/discharge power required for the battery 50, based on the state of charge SOC. The charge-discharge required power Pb* is set to a value 0 when the state of charge SOC is within a management range including a target ratio (for example, 60%), is set to a discharging power (positive value) when the state of charge SOC is higher than an upper limit value of the management range, and is set to a charging power (negative value) when the state of charge SOC is lower than a lower limit value of the management range. Additionally, the battery ECU 52 calculates an input limit Win and an output limit Wout of the battery 50 that are allowable maximum powers chargeable into and dischargeable from the battery 50, based on the state of charge SOC and the battery temperature Tb.

The HVECU 70 is configured as a CPU 72-based microprocessor and includes a ROM 74 configured to store processing programs, a RAM 76 configured to temporarily store data, a timer 78, a flash memory, input/output ports and a communication port, in addition to the CPU 72. Signals from various sensors are input into the HVECU 70 via the input port. The signals input into the HVECU 70 include, for example, an ignition signal IG from an ignition switch 80 and a shift position SP from a shift position sensor 82 configured to detect an operating position of a shift lever 81.

The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an ambient temperature Thou from an ambient temperature sensor 89. The HVECU 70 is connected with the engine ECU 24, the motor ECU 40 and the battery ECU 52 via the respective communication ports as described above.

The hybrid vehicle 20 of the embodiment having the above configuration may be driven in a hybrid drive mode (HV drive mode) with operation of the engine 22 or in an electric drive mode (EV drive mode) with stop of operation (for example, fuel injection control) of the engine 22.

Figure 3:
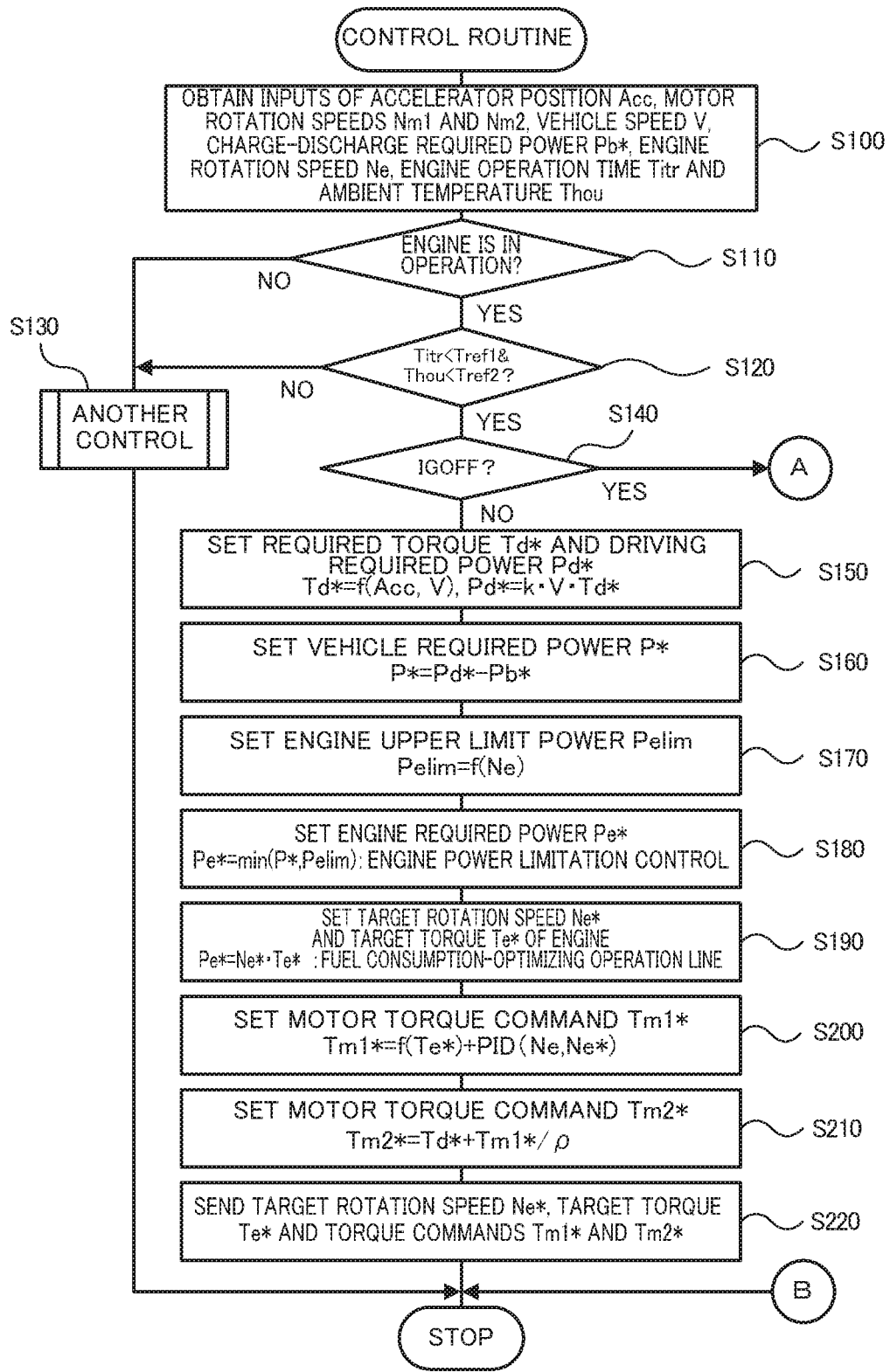
FIG. 3 is a flowchart showing one example of a control routine performed by an HVECU 70.
Figure 4:
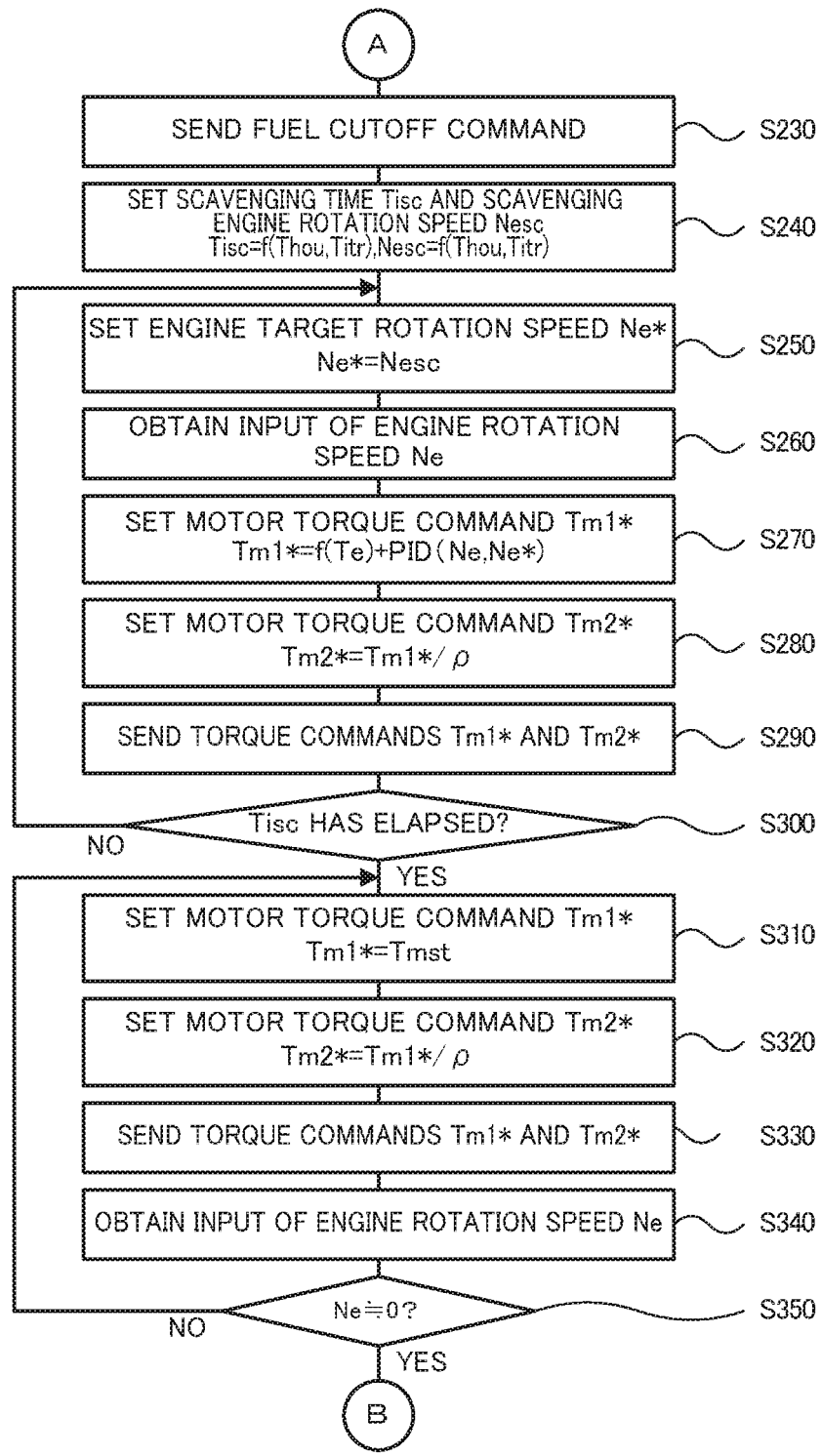
FIG. 4 is a flowchart showing the example of the control routine performed by the HVECU 70.

The following describes operations of the hybrid vehicle 20 of the embodiment having the above configuration and more specifically series of operations when the engine 22 is started along with system activation in a cold time. FIG. 3 and FIG. 4 are flowcharts showing one example of a control routine performed by the HVECU 70. This control routine is performed repeatedly at predetermined time intervals (for example, at every several msec).

When this control routine is triggered, the CPU 72 of the HVECU 70 first obtains input data, for example, the accelerator position Acc from the accelerator pedal position sensor 84, the vehicle speed V from the vehicle speed sensor 88, the ambient temperature Thou from the ambient temperature sensor 89, the rotation speeds Nm1 and Nm2 of the motors MG1 and MG2, the charge-discharge required power Pb*, the engine rotation speed Ne, and an engine operation time Titr (S100). The rotation speeds Nm1 and Nm2 of the motors MG1 and MG2 are the rotation speeds calculated based on the rotational positions θm1 and θm2 of the respective rotors of the motors MG1 and MG2 input from the rotational position detection sensors, and are input from the motor ECU 40 by communication. The charge-discharge required power Pb* is the power (electric power) set based on the state of charge SOC, and is input from the battery ECU 52 by communication. The engine rotation speed Ne is the rotation speed calculated based on the rotational position of the crankshaft 26 input from the crank position sensor 23, and is input from the engine EU 24 by communication. The engine operation time Titr is a time elapsed since an engine start time when the engine 22 is started along with system activation, and is input as a measured value by the timer 78.

The CPU 72 subsequently determines whether the engine 22 is in operation or not (S110). When it is determined that the engine 22 is not in operation, the CPU 72 performs another control (control in the EV drive mode) (S130) and terminates this routine. When it is determined that the engine 22 is in operation, on the other hand, the CPU 72 subsequently determines whether the input engine operation time Titr is shorter than a predetermined time Tref1 and whether the ambient temperature Thou is lower than a predetermined temperature Tref2 (S120). This determination aims to determine whether an immediate stop of the operation of the engine 22 is likely to cause dew condensation due to the water content and the fuel component (hydrogen component) included in the exhaust gas remaining in the combustion chamber. When it is determined that the engine operation time Titr is equal to or longer than the predetermined time Tref1 or when it is determined that the ambient temperature Thou is equal to or higher than the predetermined temperature Tref2, the CPU 72 performs another control (control in the EV drive mode) (S130) and terminates this routine. When it is determined that the engine operation time Titr is shorter than the predetermined time Tref1 and that the ambient temperature Thou is lower than the predetermined temperature Tref2, on the other hand, the CPU 72 subsequently determines whether the ignition switch 80 is off (S140). This determination aims to determine whether there is a request not for an intermittent stop of the engine 22 but for a forcible stop of the engine 22.

When it is determined that the ignition switch 80 is not off, the CPU 72 sets a required torque Td* that is required for driving, based on the input accelerator position Acc and the vehicle speed V, and sets a driving required power Pd* that is required for driving by multiplying the required torque Td* by a rotation speed Nd of the driveshaft 36 (for example, the rotation speed Nm2 of the motor MG2) (S150). The CPU 72 subsequently subtracts the charge-discharge required power Pb* of the battery 50 (which takes a positive value when the battery 50 is discharged) from the driving required power Pd* to set a vehicle required power P* that is required for the vehicle (S160). The CPU 72 then sets an engine upper limit power Pelim that is an upper limit of power which the engine 22 is allowed to output, in order to suppress a regenerative torque of the motor MG1 (S170). The engine upper limit power Pelim may be set to decrease with a decrease in engine rotation speed Ne, for example, such as to more significantly limit the power of the engine 22 at the lower engine rotation speed Ne. According to a modification, the engine upper limit power Pelim may be set to decrease with a decrease in engine water temperature Thw or with a decrease in engine oil temperature Thoi. According to another modification, the engine upper limit power Pelim may be a fixed value irrespective of the conditions of the engine 22.

Figure 5:
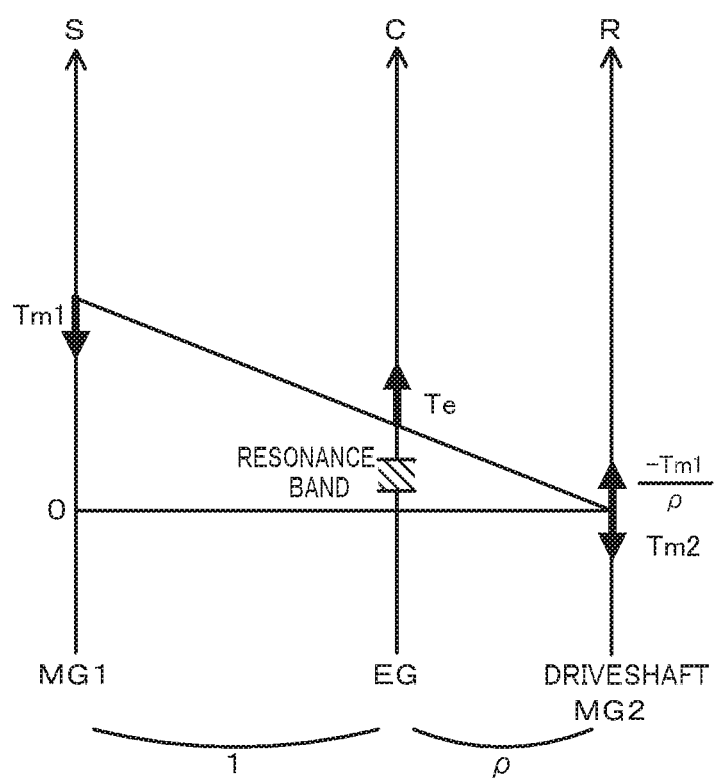
FIG. 5 is a diagram illustrating one example of an alignment chart showing a dynamic relationship between rotation speed and torque with regard to rotational elements of a planetary gear 30 when power is output from the engine 22.

After setting the vehicle required power P* and the engine upper limit power Pelim, the CPU 72 performs engine power limitation control to set the smaller between the vehicle required power P* and the engine upper limit value Pelim to an engine required power Pe* that is required for the engine 22 (S180). The CPU 72 subsequently sets a target rotation speed Ne* and a target torque Te* of the engine 22 using the engine required power Pe* and an operation line for efficient operation of the engine 22 (for example, fuel consumption-optimizing operation line) (S190). The CPU 72 then sets a torque command Tm1* of the motor MG1 according to Expression (1) given below (S200). Expression (1) is a relational expression in rotation speed feedback control to make the rotation speed Ne of the engine 22 equal to the target rotation speed Ne*. In Expression (1), the first term on the right side is a feedforward term, the second term and the third term on the right side are respectively a proportional term and an integral term of feedback terms. The first term on the right side denotes a torque for receiving a torque output from the engine 22 and applied to a rotating shaft of the motor MG1 via the planetary gear 30. On the right side, "kp" of the second term denotes a gain of the proportional term, and "ki" of the third term denotes a gain of the integral term. FIG. 5 illustrates one example of an alignment chart showing a dynamic relationship between the rotation speed and the torque with regard to the rotational elements of the planetary gear 30 when power is output from the engine 22. In FIG. 5, an S axis shows the rotation speed of the sun gear that is equal to the rotation speed Nm1 of the motor MG1. A C axis shows the rotation speed of the carrier that is equal to the rotation speed Ne of the engine 22. An R axis shows the rotation speed of the ring gear that is equal to the rotation speed Nd of the driveshaft 36. A thick arrow on the S axis denotes a torque output from the motor MG1, and a thick arrow on the C axis denotes a torque output from the engine 22. Two thick arrows on the R axis denote torques output from the motors MG1 and MG2 and applied to the drive shaft 36. As understood from the alignment chart, when torque (power) is output from the engine 22, the torque applied from the engine 22 via the planetary gear 30 to the rotating shaft of the motor MG1 is a positive torque, and the torque Tm1 output from the motor MG1 for receiving this positive torque is a negative torque (regenerative torque). An increase in torque (power) output from the engine 22 increases the positive torque applied to the rotating shaft of the motor MG1, decreases the torque Tm1 of the motor MG1 (i.e., increases the regenerative torque) and decreases the electric power of the motor MG1 (i.e., increases the generated electric power). The processing of S180 described above limits the power output from the engine 22 with the engine upper limit power Pelim, in order to limit the regenerative torque of the motor MG1. The torque command Tm1* of the motor MG1 is limited by torque limitation of a gradual change process such as a rate process or a smoothing process. For example, the torque command Tm1* may be limited with torque limitation values Tm1max and Tm1min that are calculated from a rate value α according to Expression (2) and Expression (3) given below, in order to suppress an abrupt change in torque output from the motor MG1 and thereby suppress gear rattle of the planetary gear 30.

$$Tm1^* = -Te^* \cdot [\rho/(1+\rho)] + kp \cdot (Ne^* - Ne) + ki \cdot \int (Ne^* - Ne) dt \quad (1)$$

$$Tm1\max = \text{previous } Tm1^* + \alpha \quad (2)$$

$$Tm1\min = \text{previous } Tm1^* - \alpha \quad (3)$$

The CPU 72 subsequently subtracts a torque ($-Tm1^*/\rho$) that is output from the motor MG1 and applied to the driveshaft 36 via the planetary gear 30 when the motor MG1 is driven with the torque command Tm1*, from the required torque Td* to set a torque command Tm2* of the motor MG2 according to Expression (4) given below (S210). The torque command Tm2* of the motor MG2 is limited with torque limitation values Tm2max and Tm2min that are calculated according to Expression (5) and Expression (6) given below, in order to make the charge-discharge power of the battery 50 within the range of the input limit Win and the output limit Wout. Like the torque command Tm1*, the torque command Tm2* is also limited by torque limitation of a gradual change process such as a rate process or a smoothing process.

$$Tm2^* = Td^* + Tm1^*/\rho \quad (4)$$

$$Tm2\max = (Wout - Tm1^* \cdot Nm1)/Nm2 \quad (5)$$

$$Tm2\min = (Win - Tm1^* \cdot Nm1)/Nm2 \quad (6)$$

After setting the target rotation speed Ne* and the target torque Te* of the engine 22 and the torque commands Tm1* and Tm2* of the motors MG1 and MG2, the CPU 72 sends the target rotation speed Ne* and the target torque Te* to the engine ECU 24 while sending the torque commands Tm1* and Tm2* of the motors MG1 and MG2 to the motor ECU 40 (S220) and then terminates this routine. When receiving the target rotation speed Ne* and the target torque Te*, the engine ECU 24 performs intake air flow control, fuel injection control and ignition control of the engine 22, such as to operate the engine 22 with the received target rotation speed Ne* and target torque Te*. When receiving the torque commands Tm1* and Tm2* of the motors MG1 and MG2, the motor ECU 40 performs switching control of the plurality of switching elements included in the respective inverters 41 and 42, such as to drive the motors MG1 and MG2 with the torque commands Tm1* and Tm2*.

Figure 6:
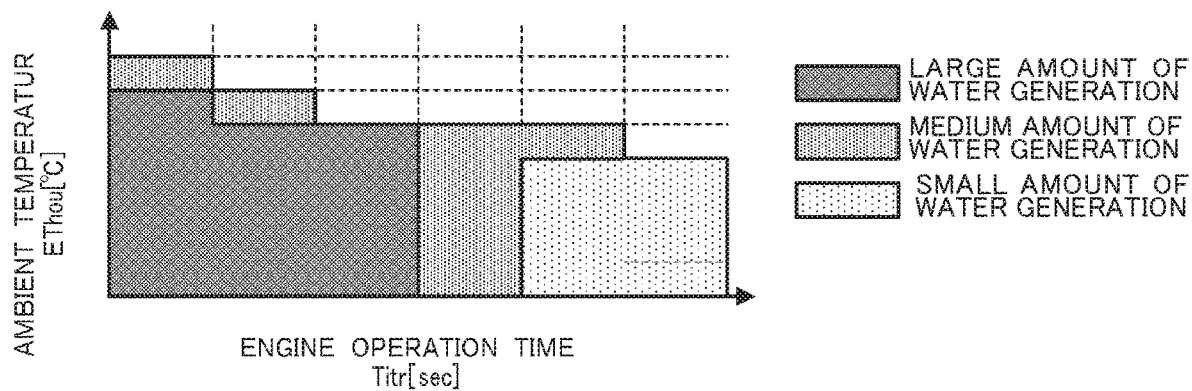
FIG. 6 is a diagram showing a relationship between ambient temperature Thou and engine operation time Titr with regard to different estimated amounts of water generation.
Figure 7:
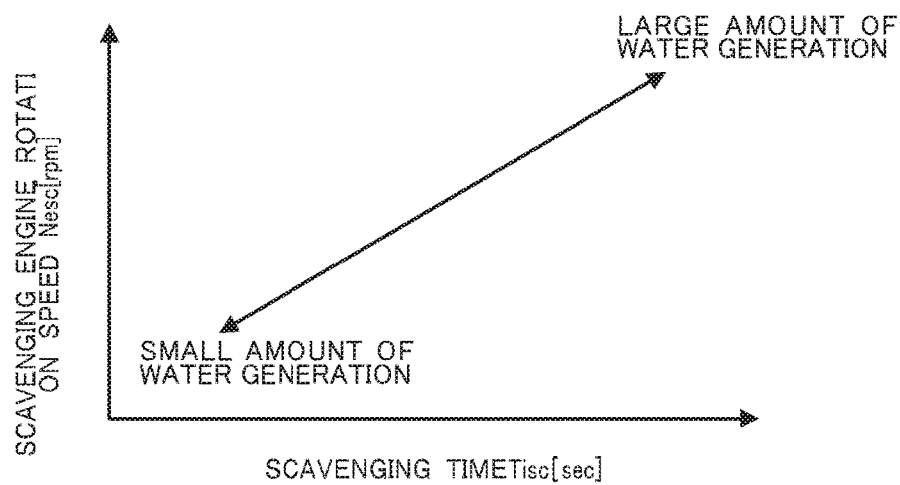
FIG. 7 is a diagram showing a relationship between scavenging engine rotation speed Nesc and scavenging time Tisc with regard to different estimated amounts of water generation.

When it is determined at S140 that the ignition switch 80 is off, the CPU 72 sends a fuel cutoff command to the engine ECU 24 to cut off fuel injection of the engine 22 (S230). The CPU 72 performs scavenging control to motor the engine 22 and thereby discharge the exhaust gas and the like remaining in the combustion chamber of the engine 22 to outside of the combustion chamber, before stopping rotation of the engine 22. The scavenging control first sets a scavenging engine rotation speed Nesc that is a target value of engine rotation speed in the process of motoring the engine 22, and a scavenging time Tisc that is a duration time when motoring of the engine 22 is continued (S240). The scavenging engine rotation speed Nesc and the scavenging time Tisc may be set, based on the engine operation time Titr (operation duration time of the engine 22 that is started along with system activation) and the ambient temperature Thou. FIG. 6 shows a relationship between the ambient temperature Thou and the engine operation time Titr with regard to different estimated amounts of water generation. FIG. 7 shows a relationship between the scavenging engine rotation speed Nesc and the scavenging time Tisc with regard to a variation in estimated amount of water generation. The lower temperature in the combustion chamber causes the more dew condensation due to the water content and the like included in the exhaust gas remaining in the combustion chamber. The amount of water generation in the combustion chamber (estimated amount of water generation) is expected to increase with a decrease in engine operation time Titr (operation time of the engine 22 that is started along with system activation) and to increase with a decrease in ambient temperature Thou as shown in FIG. 6. The higher engine rotation speed enables the exhaust gas and the like in the combustion chamber and the water accumulated in the combustion chamber to be decreased more quickly. The scavenging engine rotation speed Nesc is accordingly set to increase with an increase in estimated amount of water generation, and the scavenging time Tisc is set to increase with an increase in estimated amount of water generation, as shown in FIG. 7. Accordingly, the scavenging engine rotation speed Nesc is set to provide the larger value at the shorter engine operation time Titr and to provide the larger value at the lower ambient temperature Thou. The scavenging time Tisc is set to provide the larger value at the shorter engine operation time Titr and to provide the larger value at the lower ambient temperature Thou. The excessively high scavenging engine rotation speed Nesc, however, gives the driver a feeling of strangeness due to the engine noise, and the excessively longer scavenging time Tisc gives the driver a feeling of strangeness due to a delayed stop of the engine 22. By taking into account these factors, it is preferable to set the scavenging engine rotation speed Nesc and the scavenging time Tisc in a well-balanced range. In the engine 22 equipped with the exhaust gas recirculation system 160, the exhaust gas or the like discharged from the combustion chamber is likely to recirculate to the air intake side through the EGR pipe 162. The scavenging control is thus basically performed in the closed position of the EGR valve 164. In the open position of the EGR valve 164, it is preferable to set the scavenging time Tisc and the scavenging engine rotation speed Nesc by taking into account the possible recirculation of the exhaust gas or the like. According to a modification, the scavenging engine rotation speed Nesc may be set to increase with a decrease in engine water temperature Thw or with a decrease in engine oil temperature Thoi, and the scavenging time Tisc may be set to increase with a decrease in engine water temperature Thw or with a decrease in engine oil temperature Thoi. According to another modification, at least one of the scavenging time Tisc and the scavenging engine rotation speed Nesc may be a fixed value irrespective of the conditions of the engine 22.

After setting the scavenging time Tisc and the scavenging engine rotation speed Nesc, the CPU 72 sets the scavenging engine rotation speed Nesc to the target rotation speed Ne* of the engine 22 (S250), obtains input of the engine rotation speed Ne (S260), and sets the torque command Tm1* of the motor MG1 according to Expression (7) given below by rotation speed feedback control to motor the engine 22 and thereby make the engine rotation speed Ne equal to the target rotation speed Ne* (S270). Expression (7) is obtained by substituting "Te*" in Expression (1) given above with a negative torque Te output from the engine 22 by friction of the engine 22. The torque command Tm1* is limited with the torque limitation values Tm1max and Tm1min calculated according to Expression (2) and Expression (3) given above. The CPU 72 subsequently sets a torque for cancelling a torque (−Tm1*/ρ) that is applied to the driveshaft 36 via the planetary gear 30 when the torque command Tm1* is output from the motor MG1, to the torque command Tm2* of the motor MG2 according to Expression (8) given below (S280). After setting the torque commands Tm1* and Tm2* of the motors MG1 and MG2, the CPU 72 sends the set torque commands Tm1* and Tm2* to the motor ECU 40 (S290) and determines whether a time elapsed since a start of the scavenging control reaches the scavenging time Tisc set at S240 (S300). When the elapsed time does not yet reach the scavenging time Tisc, the CPU 72 goes back to S250 and repeats the processing of S250 to S290 to continue motoring of the engine 22.

$$Tm1^* = -Te \cdot [\rho/(1+\rho)] + kp \cdot (Ne^* - Ne) + ki \cdot \smallint (Ne^* - Ne) dt \qquad (7)$$

$$Tm2^* = -Tm1^*/\rho \qquad (8)$$

Figure 8:
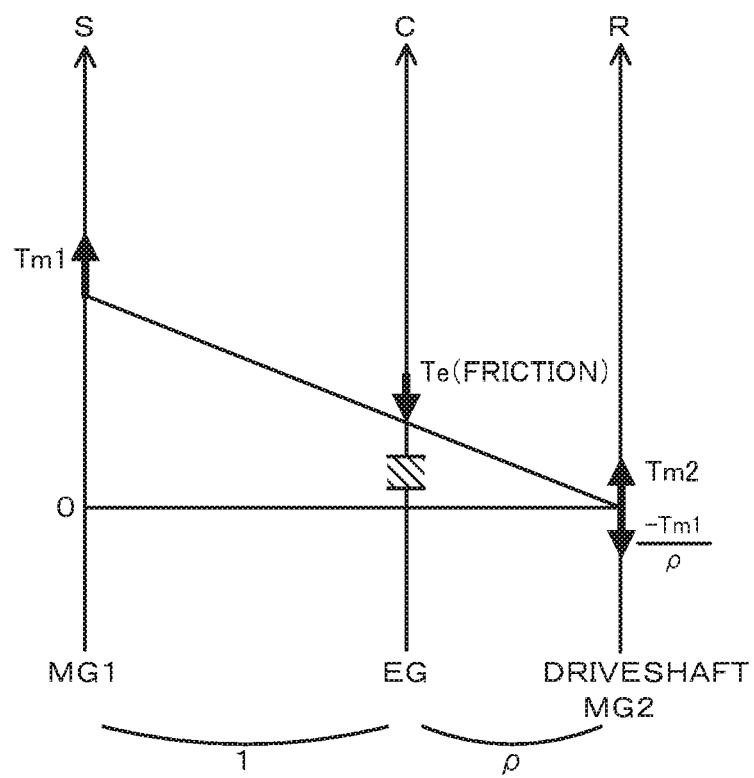
FIG. 8 is a diagram illustrating one example of an alignment chart when fuel supply to the engine 22 is cut off and the engine is motored by a motor MG1.
Figure 9:
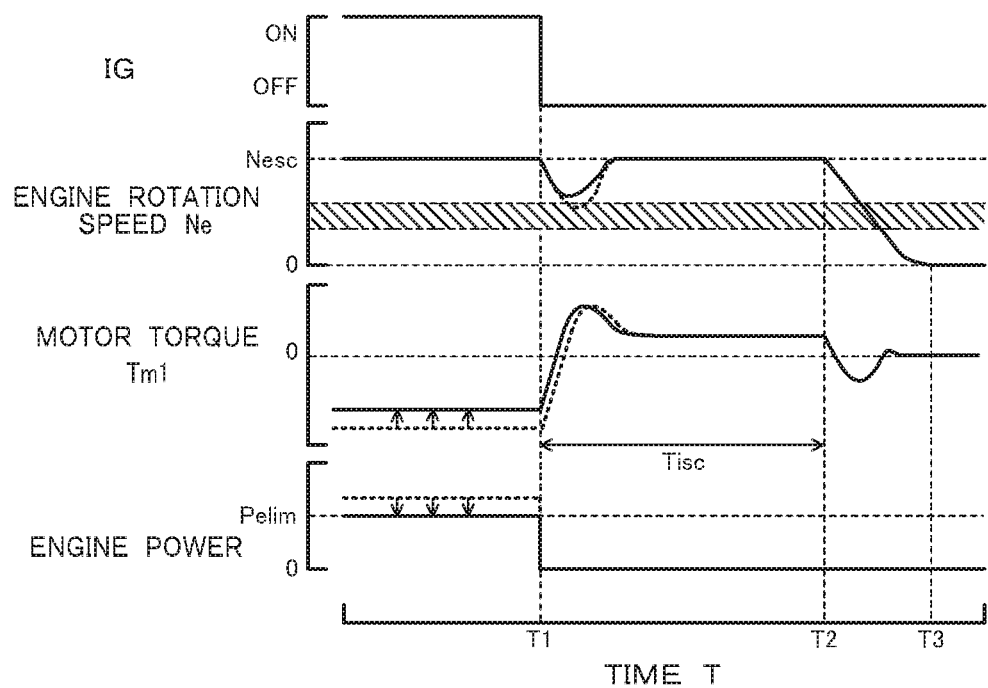
FIG. 9 is a diagram illustrating time changes in engine rotation speed Ne, motor torque Tm1 and engine power when fuel supply is cut off and the engine 22 is motored from the state that the engine 22 is in load operation accompanied with engine power limitation control.

FIG. 8 illustrates one example of an alignment chart when the fuel supply to the engine 22 is cut off and the engine 22 is motored by the motor MG1. FIG. 9 illustrates time changes in engine rotation speed Ne, motor torque Tm1 and engine power when fuel supply is cut off and the engine 22 is motored from the state that the engine 22 is in load operation accompanied with the engine power limitation control. When fuel supply to the engine 22 is cut off, the torque applied to the rotating shaft of the motor MG1 by friction of the engine 22 is a negative torque (regenerative torque), and the torque output from the motor MG1 for receiving this negative torque is a positive torque (driving torque) as shown in FIG. 8. It is here assumed to shift from the state that torque (power) is output from the engine 22 to the scavenging control that cuts off the fuel supply to the engine 22 and causes the engine 22 to be motored by the motor MG1. This corresponds to a change from the state of FIG. 5 in the alignment chart that outputs the negative torque from the motor MG1 as described above to the state of FIG. 8 in the alignment chart that outputs the positive torque from the motor MG1. Immediately after the shift from the state that torque (power) is output from the engine 22 to the scavenging control, there is a large difference between the negative torque output from the motor MG1 and the positive torque that provides the engine rotation speed required for scavenging (scavenging engine rotation speed Nesc). It accordingly takes time to output the positive torque, and the engine rotation speed Ne temporarily drops. A drive system including the damper 28 and the planetary gear 30 has a natural resonance frequency band (resonance band). A large drop of the engine rotation speed Ne causes the engine rotation speed Ne to enter the resonance band (as shown by a broken line curve in FIG. 9) and thereby causes resonance of the drive system and vibration of the vehicle. According to the embodiment, on satisfaction of the conditions to shift to the scavenging control in response to a stop request of the engine 22 (i.e., the engine operation time Titr is shorter than the predetermined time Tref1 and the ambient temperature Thou is lower than the predetermined temperature Tref2), the power output from the engine 22 is limited with the engine upper limit power Pelim as the upper limit. This increases the torque output from the motor MG1 (i.e., decreases as a negative value) and reduces the difference from the positive torque that is to be output from the motor MG1 at the shift to the scavenging control (as shown by a solid line curve in FIG. 9). This configuration causes the torque output from the motor MG1 at the shift to the scavenging control to more quickly reach the positive torque (driving torque), compared with a configuration without limitation of power output from the engine 22. This configuration reduces the drop of the engine rotation speed Ne and prevents the engine rotation speed Ne from entering the resonance band.

When it is determined at S300 that the time elapsed since a start of the scavenging control reaches the scavenging time Tisc, the CPU 72 sets a torque Tmst for causing the engine rotation speed Ne to quickly pass through the resonance band and stopping rotation of the engine 22 to the torque command Tm1* of the motor MG1 (S310), sets the torque command Tm2* of the motor MG2 according to Expression (8) given above (S320) and sends the torque commands Tm1* and Tm2* to the motor ECU 40 (S330). The CPU 72 subsequently obtains input of the engine rotation speed Ne (S340) and determines whether the input engine rotation speed Ne is approximately equal to a value 0 (S350). When it is determined that the engine rotation speed Ne is not approximately equal to the value 0, the CPU 72 goes back to S310 and repeats the processing of S310 to S340. When it is determined that the engine rotation speed Ne is approximately equal to the value 0, on the other hand, the CPU 72 determines that rotation of the engine 22 is stopped and terminates this routine.

As described above, on satisfaction of the conditions to shift to the scavenging control in response to a stop request of the engine 22, the hybrid vehicle 20 of the first embodiment performs the engine power limitation control to limit the power output from the engine 22 with the engine upper limit power Pelim as the upper limit. This increases the torque output from the motor MG1 (i.e., decreases as a negative value) and reduces the difference from the positive torque (driving torque) that is to be output from the motor MG1 at the shift to the scavenging control. This configuration causes the torque output from the motor MG1 at the shift to the scavenging control to more quickly reach the positive torque (driving torque), compared with the configuration without limitation of power output from the engine 22. This configuration reduces the drop of the engine rotation speed Ne, prevents the engine rotation speed Ne from entering the resonance band and thereby suppresses vibration or the like of the vehicle.

The hybrid vehicle 20 of the first embodiment sets the engine upper limit power Pelim to provide the smaller value at the lower engine rotation speed Ne. This configuration significantly limits the power output from the engine 22 at a relatively low engine rotation speed Ne and more effectively suppresses the engine rotation speed Ne from dropping to the resonance band at the shift to the scavenging control. This configuration relieves the limitation of the power output from the engine 22 at a relatively high engine rotation speed Ne and thereby ensures the charging power required to charge the battery 50 by regeneration of power by the motor MG1.

Additionally, at the shift to the scavenging control, the hybrid vehicle 20 of the first embodiment sets the scavenging engine rotation speed Nesc and the scavenging time Tisc, based on the engine operation time Titr (operation time of the engine 22 that is started along with system activation) and the ambient temperature Thou, and controls the motor MG1 to motor the engine 22 with the scavenging engine rotation speed Nesc over the scavenging time Tisc. This configuration enables required scavenging to be performed more appropriately before a stop of the engine 22.

Figure 10:
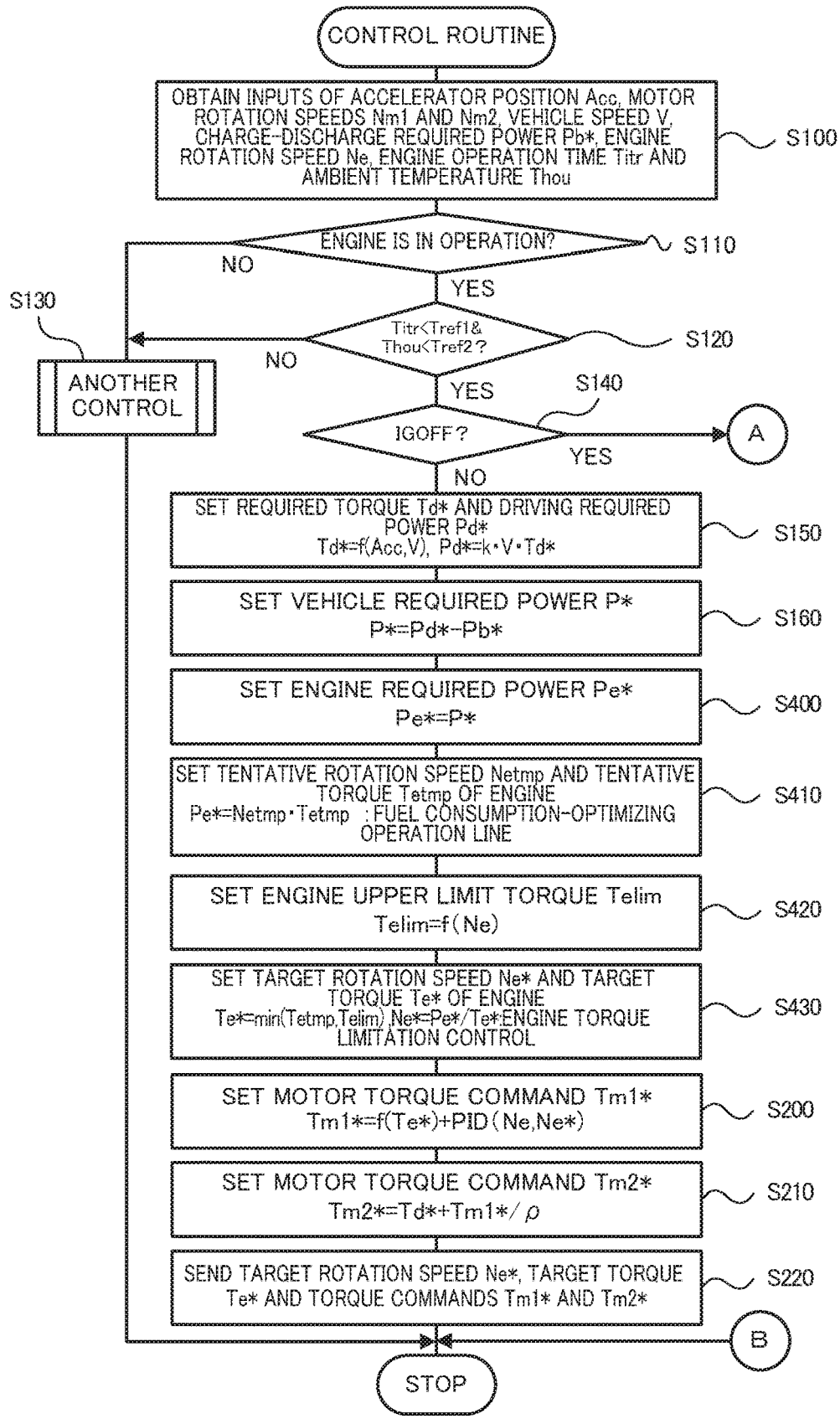
FIG. 10 is a flowchart showing a control routine according to a modification.

On satisfaction of the conditions to shift to the scavenging control in response to a stop request of the engine 22, the hybrid vehicle 20 of the first embodiment performs the engine power limitation control to limit the power output from the engine 22 with the engine upper limit power Pelim as the upper limit. A modification may perform engine torque limitation control to limit the torque output from the engine 22 without limiting the power output from the engine 22. FIG. 10 is a flowchart showing another control routine according to a modification. The like processes in FIG. 10 to those in the control routine of FIG. 3 described above are expressed by the like step numbers, and their description is omitted in order to avoid duplication. In the control routine of the modification, after setting the vehicle required power P* at S160, the CPU 72 sets the vehicle required power P* to the engine required power Pe* (S400), and sets a tentative engine rotation speed Netmp that is a tentative value of the target rotation speed of the engine 22 and a tentative engine torque Tetmp that is a tentative value of the target torque of the engine 22 by using the engine required power Pe* and an operation line (for example, a fuel consumption-optimizing operation line) (S410). The CPU 72 subsequently sets an engine upper limit torque Telim that is an upper limit value of the torque which the engine 22 is allowed to output (S420). The engine upper limit torque Telim is used to limit the regenerative torque of the motor MG1 and may be set to decrease with a decrease in engine rotation speed Ne, for example, such as to more significantly limit the torque of the engine 22 at the lower engine rotation speed Ne. According to a modification, the engine upper limit torque Telim may be set to decrease with a decrease in engine water temperature Thw or with a decrease in engine oil temperature Thoi. According to another modification, the engine upper limit torque Telim may be a fixed value irrespective of the conditions of the engine 22. After setting the tentative engine torque Tetmp and the engine upper limit torque Telim, the CPU 72 sets the smaller between the tentative engine torque Tetmp and the engine upper limit torque Telim to the target torque Te* of the engine 22 and divides the engine required power Pe* by the target torque Te* to set the target rotation speed Ne* of the engine 22 (S430). The engine torque limitation control performed to limit the torque output from the engine 22 with the engine upper limit torque Telim increases the torque output from the motor MG1 (i.e., decreases as a negative value). Like the first embodiment, this modified configuration reduces the drop of the engine rotation speed Ne at the shift to the scavenging control, prevents the engine rotation speed Ne from entering the resonance band, and thereby suppresses vibration or the like of the vehicle. Additionally, this configuration does not limit the power output from the engine 22 and accordingly increases the engine rotation speed Ne with a decrease in torque output from the engine 22 by limitation with the engine upper limit torque Telim. This causes the engine rotation speed Ne to be farther from the resonance band. This configuration prevents the engine rotation speed Ne from entering the resonance band even in the event of some drop of the engine rotation speed Ne at the shift to the scavenging control and thereby suppresses vibration or the like of the vehicle.

Second Embodiment

Figure 11:
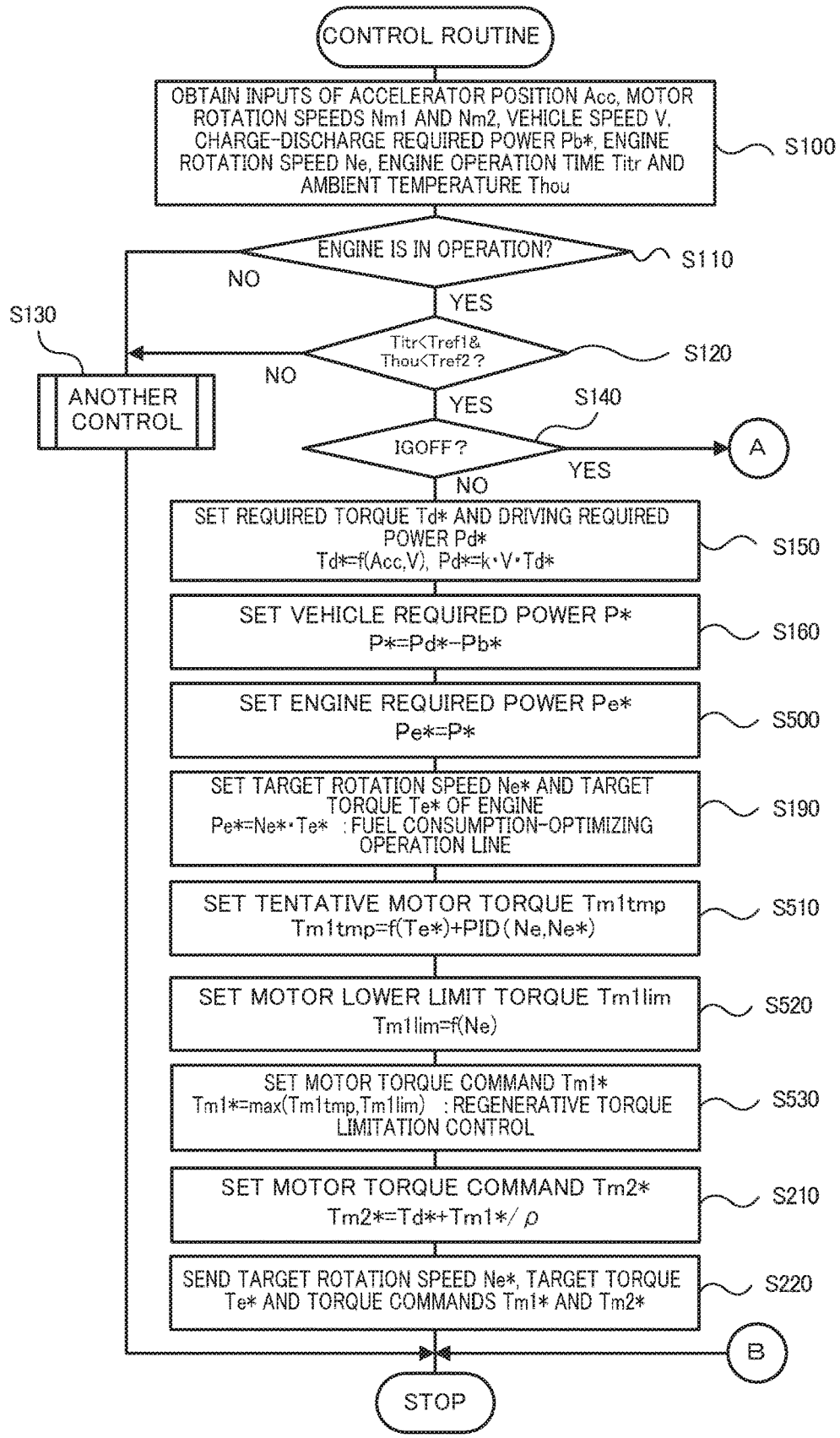
FIG. 11 is a flowchart showing a control routine according to a second embodiment.

According to a second embodiment, the hybrid vehicle 20 performs regenerative torque limitation control to limit the torque output from the motor MG1 with a motor lower limit torque Tm1lim as the lower limit, in place of the engine power limitation control. FIG. 11 is a flowchart showing a control routine according to the second embodiment. The like processes in FIG. 11 to those in the control routine of FIG. 3 described above are expressed by the like step numbers, and their description is omitted in order to avoid duplication. In the control routine of the second embodiment, after setting the vehicle required power P* at S160, the CPU 72 sets the vehicle required power P* to the engine required power Pe* (S500) and sets the target rotation speed Ne* and the target torque Te* of the engine 22 using the engine required power Pe* and the operation line (for example, fuel consumption-optimizing operation line) (S190). The CPU 72 subsequently uses Expression (9) below having the same right side as that of Expression (1) above to set a tentative motor torque Tm1tmp that is a tentative value of the torque command of the motor MG1 in order to rotate the engine 22 at the target rotation speed Ne* (S510). The CPU 72 then sets a motor lower limit torque Tm1lim that is a lower limit value of torque which the motor MG1 is allowed to output (S520) and sets the greater between the tentative motor torque Tm1tmp and the motor lower limit torque Tm1lim to the torque command Tm1* of the motor MG1 (S530). The motor lower limit torque Tm1lim may be set based on the engine rotation speed Ne to increase (i.e., to decrease as a negative value) with a decrease in engine rotation speed Ne, for example, such as to more significantly limit the regenerative torque of the motor MG1 at the lower engine rotation speed Ne. According to a modification, the motor lower limit torque Tm1lim may be set to increase (i.e., to decrease as a negative value) with a decrease in engine water temperature Thw or with a decrease in engine oil temperature Thoi. According to another modification, the motor lower limit torque Tm1lim may be a fixed value irrespective of the conditions of the engine 22.

$$Tm1tmp = -Te^* \cdot [\rho/(1+\rho)] + kp \cdot (Ne^* - Ne) + ki \cdot \int (Ne^* - Ne) \, dt \quad (9)$$

Figure 12:
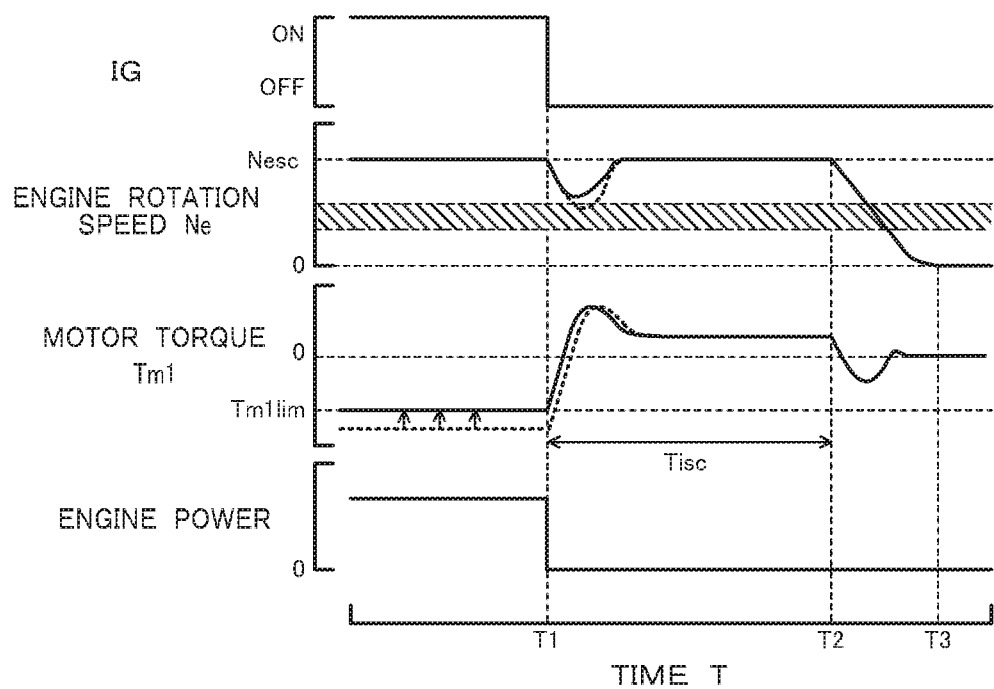
FIG. 12 is a diagram illustrating time changes in engine rotation speed Ne, motor torque Tm1 and engine power when fuel supply is cut off and the engine 22 is motored from the state that the engine 22 is in load operation accompanied with regenerative torque limitation control.

FIG. 12 illustrates time changes in engine rotation speed Ne, motor torque Tm1 and engine power when fuel supply is cut off and the engine 22 is motored from the state that the engine 22 is in load operation accompanied with the regenerative torque limitation control. As illustrated, the regenerative torque limitation control performed to limit the negative torque output from the motor MG1 with the motor lower limit torque Tm1lim reduces the drop of the engine rotation speed Ne at the shift to the scavenging control. This configuration prevents the engine rotation speed Ne from entering the resonance band and thereby suppresses vibration or the like of the vehicle, like the first embodiment.

Third Embodiment

Figure 13:
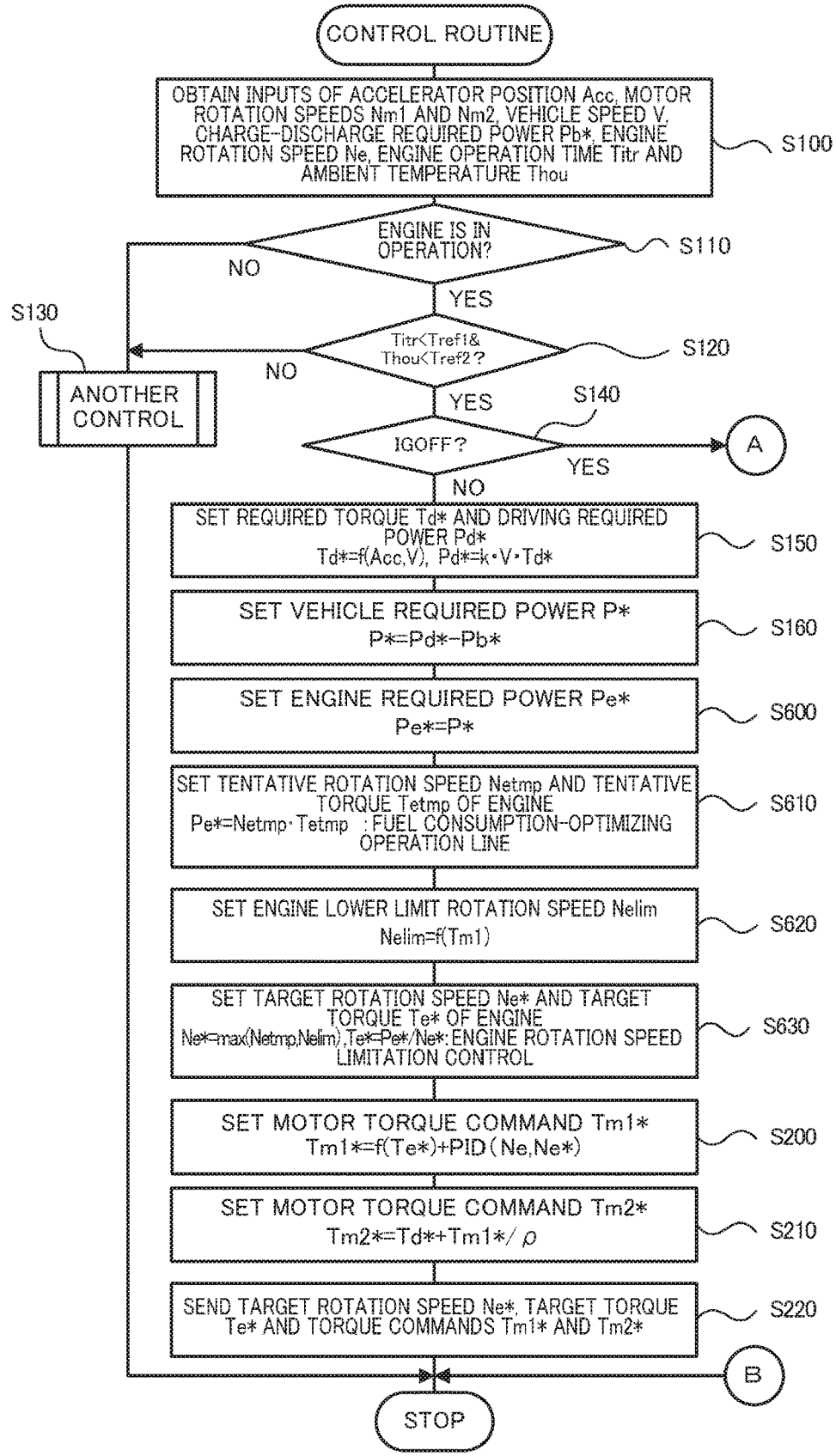
FIG. 13 is a flowchart showing a control routine according to a third embodiment.

According to a third embodiment, the hybrid vehicle 20 performs engine rotation speed limitation control to operate the engine 22 at an engine lower limit rotation speed Nelim as the lower limit, in place of the engine power limitation control. FIG. 13 is a flowchart showing a control routine according to the third embodiment. The like processes in FIG. 13 to those in the control routine of FIG. 3 described above are expressed by the like step numbers, and their description is omitted in order to avoid duplication. In the control routine of the third embodiment, after setting the vehicle required power P* at S160, the CPU 72 sets the vehicle required power P* to the engine required power Pe* (S600) and sets the tentative engine rotation speed Netmp and the tentative engine torque Tetmp by using the engine required power Pe* and an operation line (for example, a fuel consumption-optimizing operation line) (S610). The CPU 72 subsequently sets an engine lower limit rotation speed Nelim that is a lower limit value of the rotation speed at which the engine 22 is allowed to operate (S620). The CPU 72 then sets the greater between the tentative engine rotation speed Netmp and the engine lower limit rotation speed Nelim to the target rotation speed Ne* of the engine 22 and divides the engine required power Pe* by the target rotation speed Ne* to set the target torque Te* of the engine 22 (S630). The engine lower limit rotation speed Nelim may be set based on the torque Tm1 output from the motor MG1 to increase with a decrease in torque Tm1 (i.e., with an increase as a negative value). According to a modification, the engine lower limit rotation speed Nelim may be set to increase with a decrease in engine water temperature Thw or with a decrease in engine oil temperature Thoi. According to another modification, the engine lower limit rotation speed Nelim may be set to provide a higher value in a load operation state (i.e., the state that power is output from the engine 22 accompanied with regeneration of power by the motor MG1) as the operating state of the engine 22 than in a self-sustained operation state (i.e., the state that the engine 22 is operated at a predetermined rotation speed with setting the torque output from the motor MG1 to the value 0). According to another modification, the engine lower limit rotation speed Nelim may be a fixed value.

Figure 14:
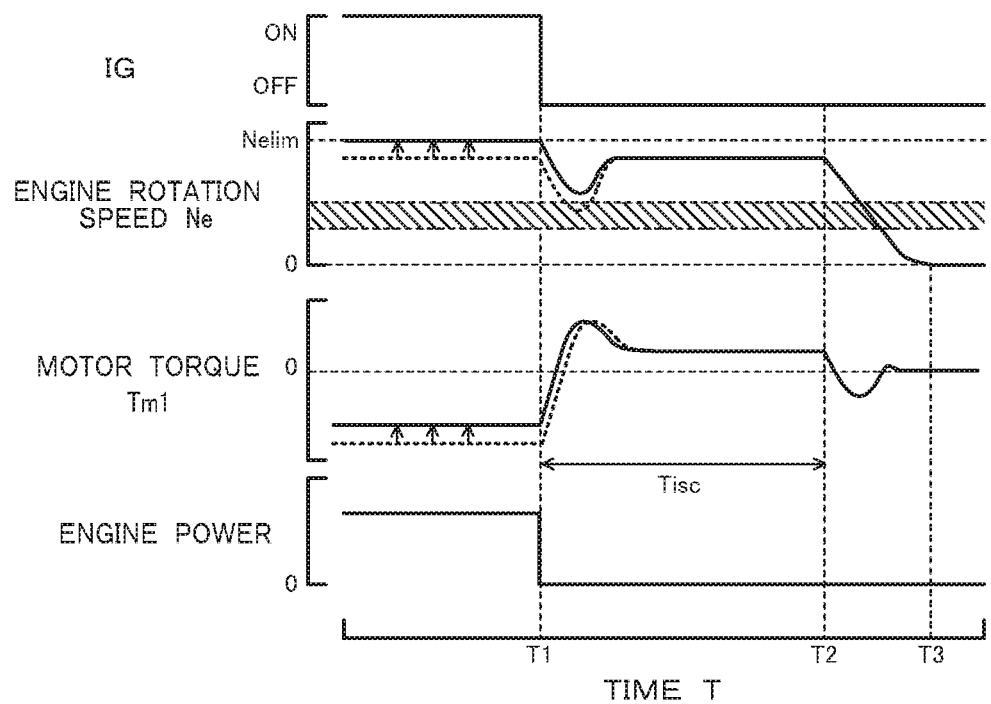
FIG. 14 is a diagram illustrating time changes in engine rotation speed Ne, motor torque Tm1 and engine power when fuel supply is cut off and the engine 22 is motored from the state that the engine 22 is in load operation accompanied with engine rotation speed limitation control.

FIG. 14 illustrates time changes in engine rotation speed Ne, motor torque Tm1 and engine power when fuel supply is cut off and the engine 22 is motored from the state that the engine 22 is in operation accompanied with the engine rotation speed limitation control. As illustrated, the engine rotation speed limitation control performed to limit the rotation speed of the engine 22 with the engine lower limit rotation speed Nelim causes the engine rotation speed Ne to be farther from the resonance band. This configuration prevents the engine rotation speed Ne from entering the resonance band even in the event of some drop of the engine rotation speed Ne at the shift to the scavenging control and thereby suppresses vibration or the like of the vehicle.

Figure 15:
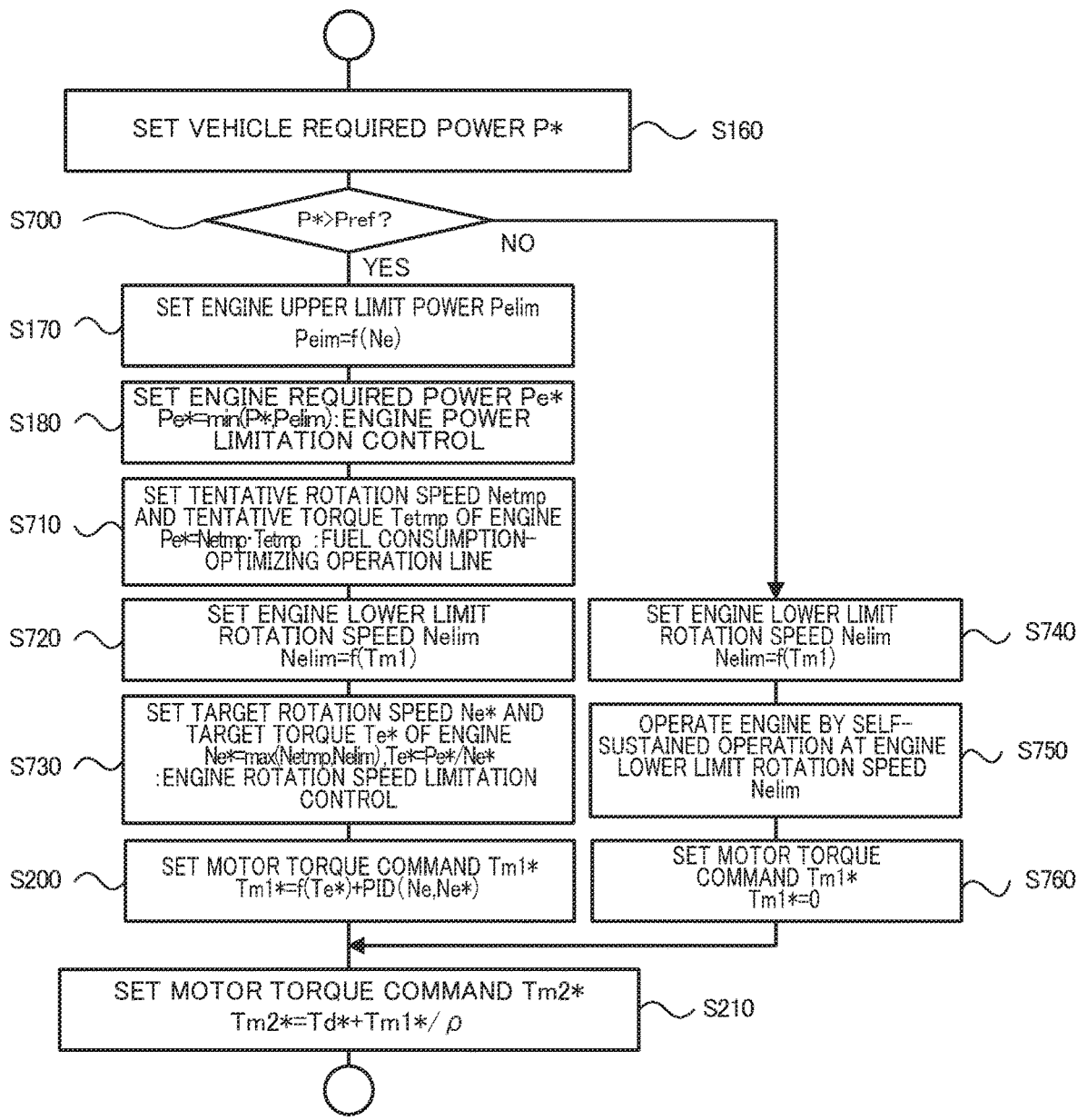
FIG. 15 is a flowchart showing part of a control routine according to a modification.

The hybrid vehicle 20 of the first embodiment is configured to perform the engine power limitation control on satisfaction of the conditions to shift to the scavenging control in response to a stop request of the engine 22. According to a modification, the engine power limitation control of the first embodiment may be performed in combination with the engine rotation speed limitation control of the third embodiment. FIG. 15 is a flowchart showing a control routine according to this modification. FIG. 15 only illustrates a processing flow performed between S160 and S210 in the control routine of FIG. 3. Non-illustrated other processes and the processes expressed by the same step numbers are identical with those in the control routine of FIG. 3. In the control routine of the modification shown in FIG. 15, after setting the vehicle required power P* at S160, the CPU 72 determines whether the vehicle required power P* is larger than a predetermined power Pref (S700). The predetermined power Pref is a reference value used to determine whether the engine 22 is to be in load operation or to be in self-sustained operation. When it is determined that the vehicle required power P* is larger than the predetermined power Pref, the CPU 72 determines that the engine 22 is to be in load operation and sets the engine upper limit power Pelim (S170). The CPU 72 subsequently sets the smaller between the vehicle required power P* and the engine upper limit power Pelim to the engine required power Pe* (S180). The engine upper limit power Pelim is described previously. The CPU 72 then sets the tentative engine rotation speed Netmp and the tentative engine torque Tetmp by using the engine required power Pe* and an operation line (for example, a fuel consumption-optimizing operation line) (S710). The CPU 72 subsequently sets the engine lower limit rotation speed Nelim (S720) and sets the greater between the tentative engine rotation speed Netmp and the engine lower limit rotation speed Nelim to the target rotation speed Ne* of the engine 22 and divides the engine required power Pe* by the target rotation speed Ne* to set the target torque Te* of the engine 22 (S730). The engine lower limit rotation speed Nelim is described previously. The CPU 72 then sets the torque command Tm1* of the motor MG1 according to Expression (1) given above (S200). When it is determined at S700 that the vehicle required power P* is equal to or smaller than the predetermined power Pref, on the other hand, the CPU 72 determines that the engine 22 is not to be in load operation and sets the engine lower limit rotation speed Nelim (S740) like S720. The CPU 72 then sends a self-sustained operation command to the engine ECU 24 to operate the engine 22 by self-sustained operation at the engine lower limit rotation speed Nelim (S750) and sets a value 0 to the torque command Tm1* of the motor MG1 (S760). As described above, this modification simultaneously performs the engine power limitation control and the engine rotation speed limitation control when the engine 22 is in load operation, while performing only the engine rotation speed limitation control when the engine 22 is not in load operation. This modification performs the engine rotation speed limitation control in combination with the engine power limitation control. Another modification may perform the engine rotation speed limitation control in combination with the engine torque limitation control.

Figure 16:
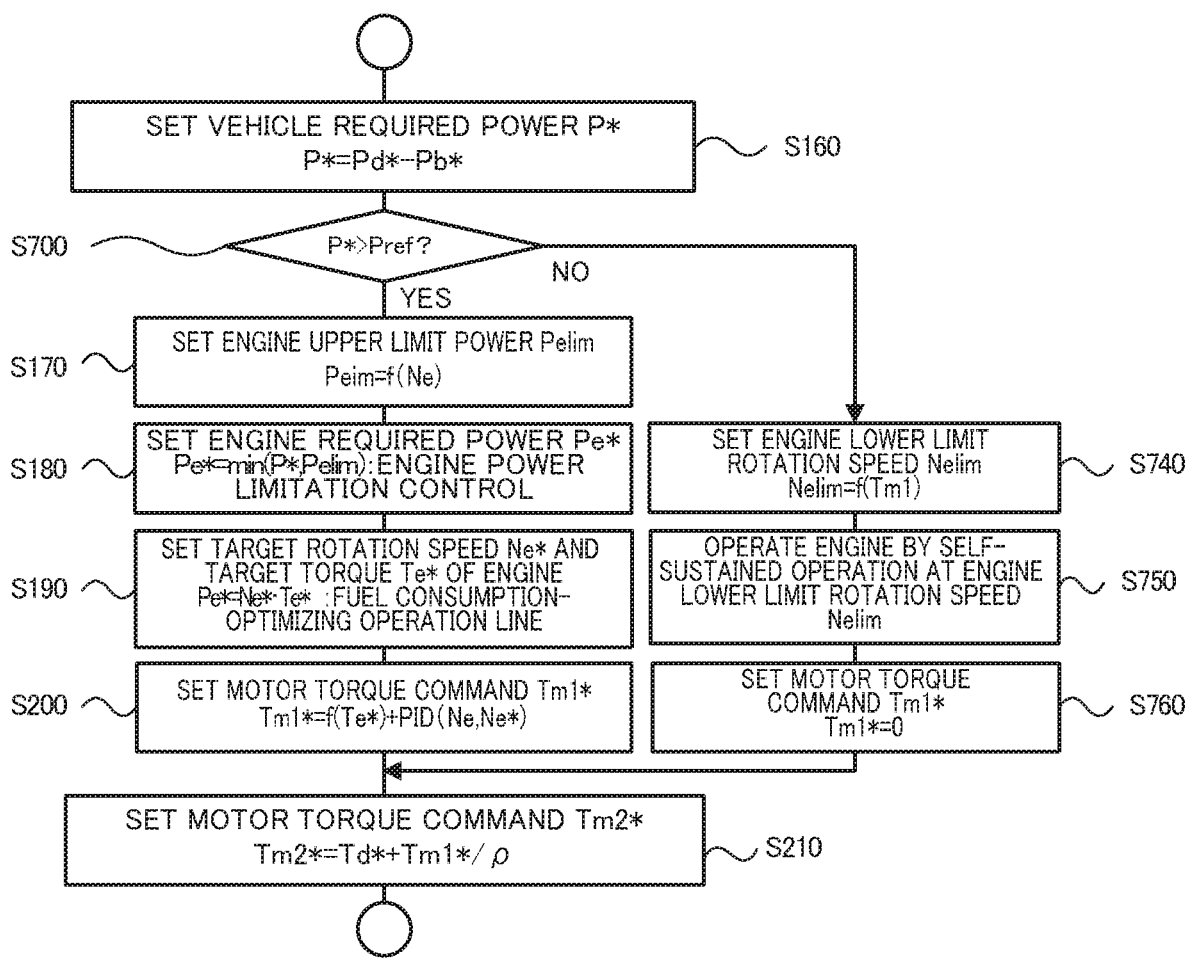
FIG. 16 is a flowchart showing part of a control routine according to another modification.

The modification described above simultaneously performs the engine power limitation control and the engine rotation speed limitation control when the engine 22 is in load operation, while performing only the engine rotation speed limitation control when the engine 22 is not in load operation. Another modification may perform only the engine power limitation control (or the engine torque limitation control) when the engine 22 is in load operation, while performing only the engine rotation speed limitation control when the engine 22 is not in load operation. FIG. 16 is a flowchart showing a control routine according to this modification. In the control routine of FIG. 16, the CPU 72 performs the same series of processes as that of S170 to S200 in the control routine of FIG. 3 when the vehicle required power P* is larger than the predetermined power Pref, while performing the same series of processes as that of S740 to S760 in the control routine of FIG. 15 when the vehicle required power P* is equal to or smaller than the predetermined power Pref.

Figure 17:
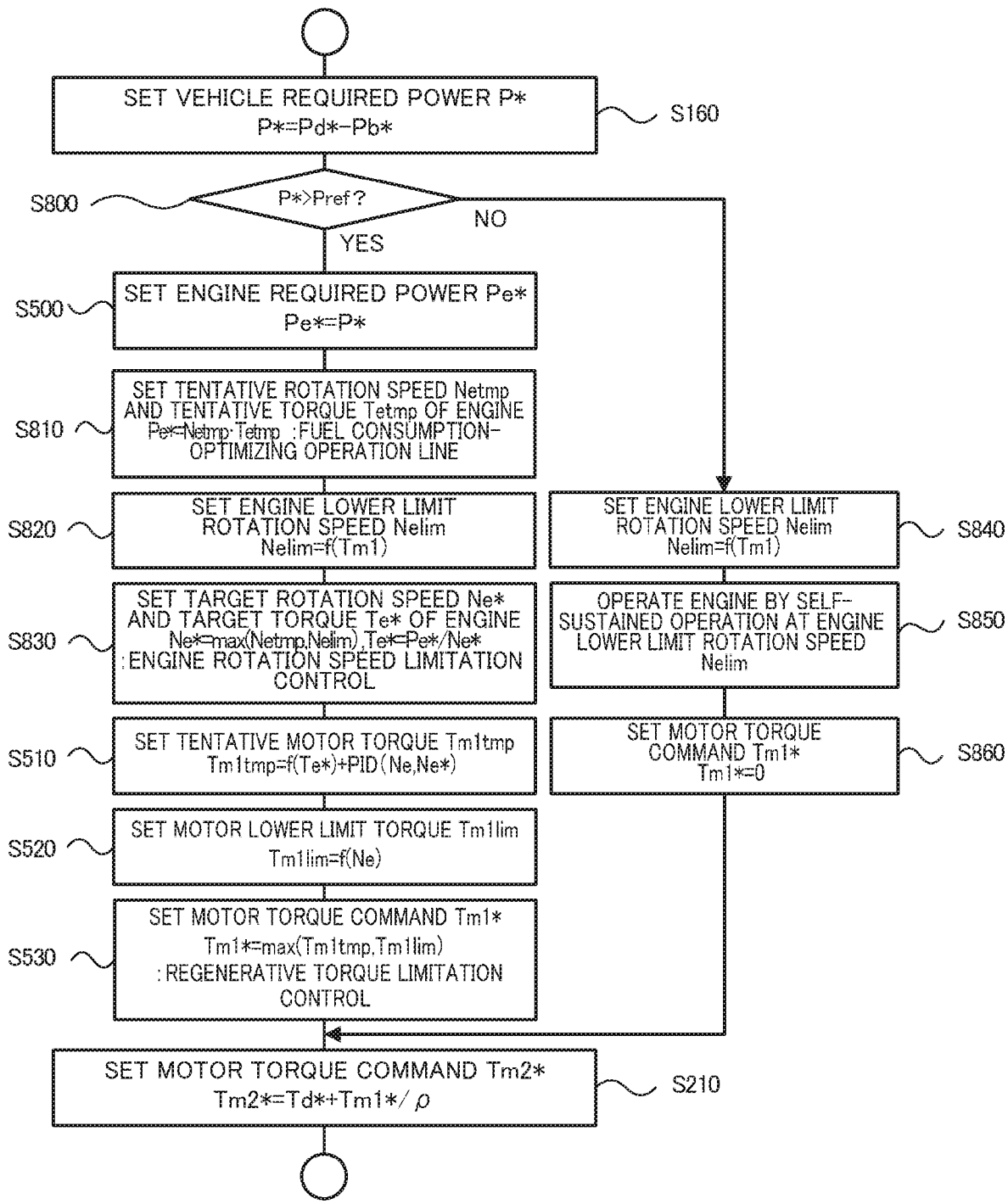
FIG. 17 is a flowchart showing part of a control routine according to another modification.

The hybrid vehicle 20 of the second embodiment is configured to perform the regenerative torque limitation control on satisfaction of the conditions to shift to the scavenging control in response to a stop request of the engine 22. According to a modification, the regenerative torque limitation control of the second embodiment may be performed in combination with the engine rotation speed limitation control of the third embodiment. FIG. 17 is a flowchart showing a control routine according to this modification. FIG. 17 only illustrates a processing flow performed between S160 and S210 in the control routine of FIG. 11. Non-illustrated other processes and the processes expressed by the same step numbers are identical with those in the control routine of FIG. 11. In the control routine of the modification shown in FIG. 17, after setting the vehicle required power P* at S160, the CPU 72 determines whether the vehicle required power P* is larger than the predetermined power Pref (S800). The predetermined power Pref is described previously. When it is determined that the vehicle required power P* is larger than the predetermined power Pref, the CPU 72 determines that the engine 22 is to be in load operation and sets the vehicle required power P* to the engine required power Pe* (S500). The CPU 72 then sets the tentative engine rotation speed Netmp and the tentative engine torque Tetmp by using the engine required power Pe* and an operation line (for example, a fuel consumption-optimizing operation line) (S810). The CPU 72 subsequently sets the engine lower limit rotation speed Nelim (S820) and sets the greater between the tentative engine rotation speed Netmp and the engine lower limit rotation speed Nelim to the target rotation speed Ne* of the engine 22 and divides the engine required power Pe* by the target rotation speed Ne* to set the target torque Te* of the engine 22 (S830). The engine lower limit rotation speed Nelim is described previously. The CPU 72 subsequently uses Expression (9) given above to set the tentative motor torque Tm1tmp (S510), sets the motor lower limit torque Tm1lim (S520) and sets the greater between the tentative motor torque Tm1tmp and the motor lower limit torque Tm1lim to the torque command Tm1* of the motor MG1 (S530). The motor lower limit torque Tm1lim is described previously. When it is determined at S800 that the vehicle required power P* is equal to or smaller than the predetermined power Pref, on the other hand, the CPU 72 determines that the engine 22 is not to be in load operation and sets the engine lower limit rotation speed Nelim (S840) like S820. The CPU 72 then sends a self-sustained operation command to the engine ECU 24 to operate the engine 22 by self-sustained operation at the engine lower limit rotation speed Nelim (S850) and sets a value 0 to the torque command Tm1* of the motor MG1 (S860). As described above, this modification simultaneously performs the regenerative torque limitation control and the engine rotation speed limitation control when the engine 22 is in load operation, while performing only the engine rotation speed limitation control when the engine 22 is not in load operation.

Figure 18:
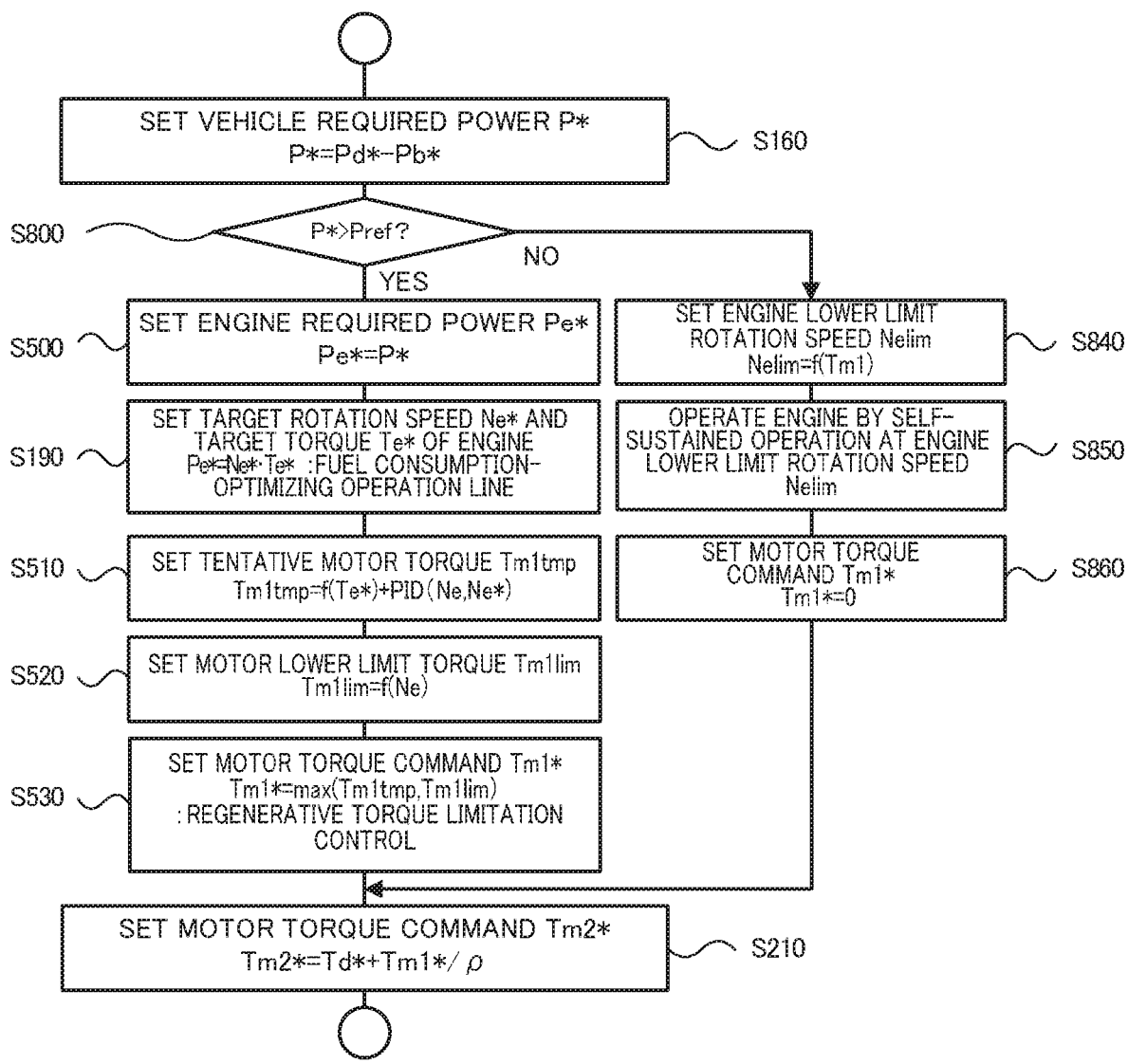
FIG. 18 is a flowchart showing part of a control routine according to another modification.

The modification described above simultaneously performs the regenerative torque limitation control and the engine rotation speed limitation control when the engine 22 is in load operation, while performing only the engine rotation speed limitation control when the engine 22 is not in load operation. Another modification may perform only the regenerative torque limitation control when the engine 22 is in load operation, while performing only the engine rotation speed limitation control when the engine 22 is not in load operation. FIG. 18 is a flowchart showing a control routine according to this modification. In the control routine of FIG. 18, the CPU 72 performs the same series of processes as that of S500, S190 and S510 to S530 in the control routine of FIG. 11 when the vehicle required power P* is larger than the predetermined power Pref, while performing the same series of processes as that of S840 to S860 in the control routine of FIG. 17 when the vehicle required power P* is equal to or smaller than the predetermined power Pref.

Figure 19:
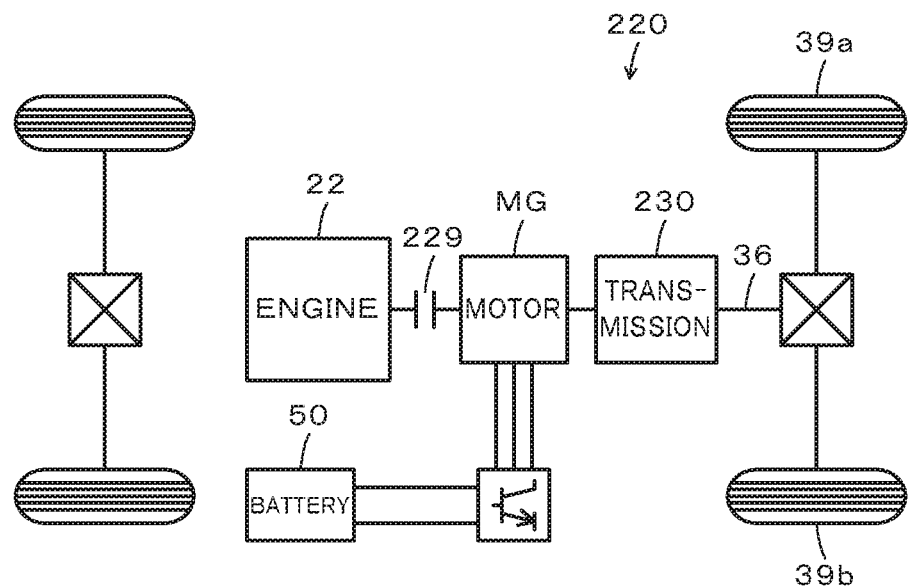
FIG. 19 is a configuration diagram schematically illustrating the configuration of a hybrid vehicle 220 according to one modification.
Figure 20:
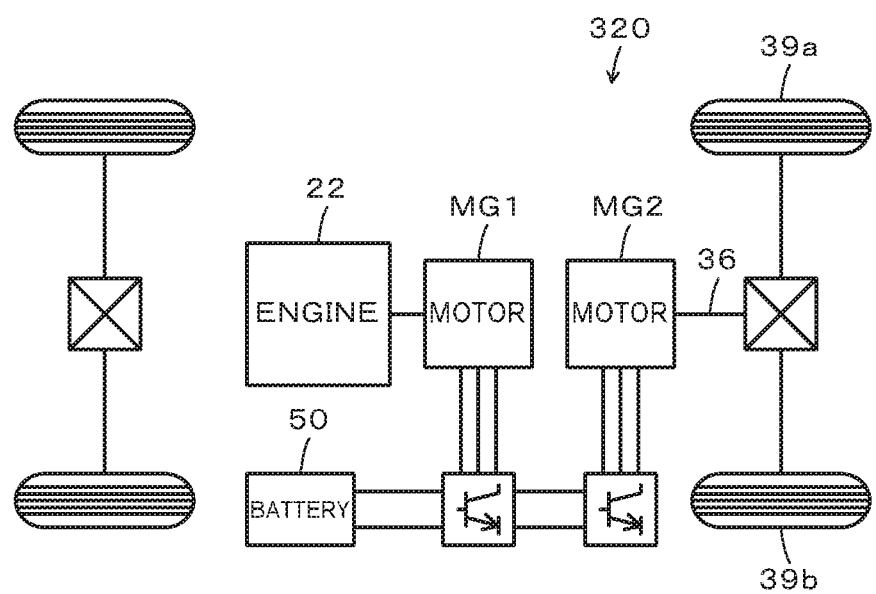
FIG. 20 is a configuration diagram schematically illustrating the configuration of another hybrid vehicle 320 according to another modification.

The hybrid vehicle 20 of the embodiment is configured such that the engine 22 and the motor MG1 are connected via the planetary gear 30 with the driveshaft 36 coupled with the drive wheels 39a and 39b and that the motor MG2 is connected with the driveshaft 36. As shown in FIG. 19, a hybrid vehicle 220 of a modification may be configured such that a motor MG is connected via a transmission 230 with a driveshaft 36 coupled with drive wheels 39a and 39b and that an engine 22 is connected via a clutch 229 with a rotating shaft of the motor MG. As shown in FIG. 20, a hybrid vehicle 320 of another modification may be configured as a series hybrid vehicle such that a motor MG2 for driving is connected with a driveshaft 36 coupled with drive wheels 39a and 39b and that a motor MG1 for power generation is connected with an output shaft of an engine 22.

As described above, the hybrid vehicle according to one aspect of the present disclosure is configured as the hybrid vehicle including the engine, the motor generator configured to regenerate power from the engine and to motor the engine, and the control device configured to control the engine and the motor generator. The control device performs motoring control that controls the motor generator to cut off fuel supply to the engine and to motor the engine from the state that the engine is in operation. When the engine is to be stopped after the motoring control, the control device causes the engine to be motored at a rotation speed that exceeds a rotation speed range of the engine causing resonance, as the motoring control.

In the hybrid vehicle of the above aspect, the control device may cause the engine to be motored at a predetermined rotation speed until elapse of a scavenging time to scavenge an exhaust gas remaining in a cylinder of the engine, as the motoring control. This configuration avoids possible problems caused by the exhaust gas remaining in the cylinder (for example, accumulation of water on an ignition plug due to dew condensation of the water content included in the exhaust gas).

In the hybrid vehicle of the above aspect configured to cause the engine to be motored at the predetermined rotation speed until elapse of the scavenging time, the control device may cause the engine to be motored such as to increase the scavenging time and/or to increase the predetermined rotation speed with a decrease in operation time of the engine that is started along with activation of the vehicle, as the motoring control. This configuration effectively prevents water from being accumulated in the cylinder.

In the hybrid vehicle of the above aspect configured to cause the engine to be motored at the predetermined rotation speed until elapse of the scavenging time, the control device may cause the engine to be motored such as to increase the scavenging time and/or to increase the predetermined rotation speed with a decrease in ambient temperature, as the motoring control. This configuration effectively prevents water from being accumulated in the cylinder.

In the hybrid vehicle of the above aspect configured to cause the engine to be motored at the predetermined rotation speed until elapse of the scavenging time, the control device may cause the engine to be motored such as to increase the scavenging time and/or to increase the predetermined rotation speed with a decrease in temperature of cooling water or engine oil of the engine, as the motoring control. This configuration effectively prevents water from being accumulated in the cylinder.

In the hybrid vehicle of the above aspect, when a stop of the engine is required on satisfaction of a predetermined execution condition, the control device may perform the motoring control and then stop the engine. And when a stop of the engine is not required on satisfaction of the predetermined execution condition, the control device may perform power limitation control that controls the engine and the motor generator to cause power to be output from the engine with a predetermined power or a predetermined torque as an upper limit and to rotate the engine at a target rotation speed in load operation of the engine accompanied with regeneration of power by the motor generator. Immediately after the shift to the motoring control, depending on an immediately preceding operation state of the engine (load operation state), there is a large torque difference between a regenerative torque (negative torque) output from the motor generator immediately before and a driving torque (positive torque) to be output from the motor generator to achieve an engine rotation speed required for scavenging in the cylinder. In this case, it takes time from a shift to the motoring control to actual motoring of the engine. The engine rotation speed is thus likely to drop temporarily and enter a resonance band and makes it likely that vibration or the like occurs in the vehicle. On satisfaction of the predetermined execution condition that enables the motoring control to be performed in response to a stop request of the engine, the hybrid vehicle of this aspect causes power to be output from the engine with the predetermined power or the predetermined torque as the upper limit in the load operation state. This configuration thus enables the regenerative torque that is output from the motor generator to the engine to be limited in advance. This reduces a difference from the driving torque that is to be output from the motor generator immediately after the shift to the motoring control. This accordingly prevents the engine rotation speed from entering the resonance band and suppresses the vibration or the like of the vehicle. The predetermined condition may include at least one of a condition that an operation time of the engine that is started along with activation of the vehicle is shorter than a predetermined time period, a condition that ambient temperature is lower than a predetermined temperature and a condition that temperature of cooling water or engine oil of the engine is lower than a predetermined temperature (the same applies to aspects described below).

In the hybrid vehicle of the above aspect, when a stop of the engine is required on satisfaction of a predetermined execution condition, the control device may perform the motoring control and then stop the engine. And when a stop of the engine is not required on satisfaction of the predetermined execution condition, the control device may perform rotation speed limitation control that controls the engine to be operated at a predetermined rotation speed as a lower limit. This configuration enables the engine rotation speed to be farther from the resonance band in advance. Even when it takes time from a shift to the motoring control to actual motoring of the engine and the engine rotation speed temporarily drops, this configuration prevents the engine rotation speed from entering the resonance band.

In the hybrid vehicle of the above aspect, when a stop of the engine is required on satisfaction of a predetermined execution condition, the control device may perform the motoring control and then stop the engine. When a stop of the engine is not required on satisfaction of the predetermined execution condition, the control device may perform regeneration limitation control that controls the motor generator to regenerate power with a predetermined negative torque as a lower limit in load operation of the engine accompanied with regeneration of power by the motor generator. This configuration causes the regenerative torque output from the motor generator to the engine to be limited in advance. This accordingly reduces a difference from the driving torque that is to be output from the motor generator immediately after a shift to the motoring control and prevents the engine rotation speed from entering the resonance band.

In the hybrid vehicle of the above aspect, when a stop of the engine is required on satisfaction of a predetermined execution condition, the control device may perform the motoring control and then stop the engine. When a stop of the engine is not required on satisfaction of the predetermined execution condition, the control device may select and perform one or both of power limitation control that controls the engine and the motor generator to cause power to be output from the engine with a predetermined power or a predetermined torque as an upper limit and to rotate the engine at a target rotation speed and rotation speed limitation control that controls the engine to be operated at a predetermined rotation speed as a lower limit. In the hybrid vehicle of this aspect, the control device may perform at least the power limitation control out of the power limitation control and the rotation speed limitation control when the engine is in load operation and may perform the rotation speed limitation control when the engine is not in load operation. The configuration of selecting the limitation control suitable for the operation state of the engine more effectively prevents the engine rotation speed from entering the resonance band in a subsequent shift to the motoring control.

In the hybrid vehicle of the above aspect, when a stop of the engine is required on satisfaction of a predetermined execution condition, the control device may perform the motoring control and then stop the engine. When a stop of the engine is not required on satisfaction of the predetermined execution condition, the control device may select and perform one or both of regeneration limitation control that controls the motor generator to regenerate power with a predetermined negative torque as a lower limit and rotation speed limitation control that controls the engine to be operated at a predetermined rotation speed as a lower limit. In the hybrid vehicle of this aspect, the control device may perform at least the regeneration limitation control out of the regeneration limitation control and the rotation speed limitation control when the engine is in load operation and may perform the rotation speed limitation control when the engine is not in load operation. The configuration of selecting the limitation control suitable for the operation state of the engine more effectively prevents the engine rotation speed from entering the resonance band in a subsequent shift to the motoring control.

The hybrid vehicle of the above aspect may be provided with a planetary gear mechanism configured such that a first rotational element, a second rotational element and a third rotational element arrayed in this sequence in an alignment chart are respectively connected with an output shaft of the engine, a rotating shaft of the motor generator and a driveshaft coupled with an axle; and a second motor generator configured to input and output power into and from the driveshaft.

The following describes the correspondence relationship between the primary elements of the above embodiment and the primary elements of the disclosure described in Summary. The engine 22 of the embodiment corresponds to the "engine", the motor MG1 corresponds to the "motor generator", the HVECU 70, the engine ECU 24 and the motor ECU 40 correspond to the "control device", and scavenging control corresponds to the "motoring control".

The aspect of the present disclosure is described above with reference to the embodiment. The present disclosure is, however, not limited to the above embodiment but various modifications and variations may be made to the embodiment without departing from the scope of the present disclosure.

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

INDUSTRIAL APPLICABILITY

The disclosure is applicable to, for example, the manufacturing industries of hybrid vehicles.

The invention claimed is:

1. A hybrid vehicle comprising:
an engine;
a motor generator configured to regenerate power from the engine and to motor the engine; and
a control device configured to control the engine and the motor generator,
wherein the control device platforms motoring control that controls the motor generator to cut off fuel supply to the engine and to motor the engine from a state that the engine is operated,
wherein when the engine is to be stopped after the motoring control, the control device causes the engine to be motored at a rotation speed that exceeds a rotation speed range of the engine causing resonance, as the motoring control,
wherein when a predetermined execution condition is satisfied when an engine stop request is initiated, the control device performs the motoring control and then stops the engine, and
wherein when the predetermined execution condition is satisfied and the engine stop request has not been initiated, the control device performs power limitation control that controls the engine and the motor generator to cause power to be output from the engine with a predetermined engine upper limit power or a predetermined engine upper limit torque as an upper limit and to rotate the engine at a target rotation speed in load operation of the engine accompanied with regeneration of power by the motor generator, and
wherein, when the predetermined execution prediction is satisfied and the engine stop request has not been initiated, the control device performs on on of:
i. sets a smaller power, the smaller power being the smaller of the engine upper limit power and a vehicle required power required for the vehicle based on an accelerator position, and causes the set smaller power to be output from the engine; and ii. sets a smaller torque, the smaller torque being the smaller of the engine upper limit torque and an engine torque set using the vehicle required power and an operation line, and causes the set smaller torque to be output from the engine, as the power limitation control.

2. The hybrid vehicle according to claim 1,
wherein the predetermined execution condition comprises at least one of:
  i. a condition that an operation time that the engine has been running along with activation of the vehicle is shorter than a predetermined time period;
  ii. a condition that ambient temperature is lower than a predetermined temperature; and
  iii. a condition that temperature of cooling water or engine oil of the engine is lower than a predetermined temperature.

3. The hybrid vehicle according to claim 1,
wherein when the predetermined execution condition is satisfied and the engine stop request has not been initiated, the control device selects and performs at least one of the power limitation control and rotation speed limitation control that controls the engine to be operated at a predetermined engine lower limit rotation speed as a lower limit, and
wherein, when the predetermined execution condition is satisfied when the engine stop request has not been initiated, the control device;
  i. sets an engine rotation speed by using a vehicle required power for a vehicle based on an accelerator position and an operation line,
  ii. sets the greater rotation speed between the engine lower limit rotation speed and the set engine rotation speed, and
  iii. causes the engine to be motored at the set greater rotation speed, as the rotation speed limitation control.

4. The hybrid vehicle according to claim 3,
wherein the control device performs at least the power limitation control out of i, the power limitation control and ii, the rotation speed limitation control when the engine is in load operation, while performing the rotation speed limitation control when the engine is not in load operation.

5. A hybrid vehicle comprising,
an engine;
a motor generator configured to regenerate power from the engine and to motor the engine; and
a control device configured to control the engine and the motor generator,
wherein the control device performs motoring control that controls the motor generator to cut off fuel supply to the engine and to motor the engine from a state that the engine is operated,
wherein when the engine is to be stopped after the motoring control, the control device causes the engine to be motored at a rotation speed that exceeds a rotation speed range of the engine causing resonance, as the motoring control,
wherein when a predetermined execution condition is satisfied when an engine stop request is initiated, the control device performs the motoring control and then stops the engine,
wherein when the predetermined execution condition is satisfied and the engine stop request has not been initiated, the control device performs rotation speed limitation control that controls the engine to be operated at a predetermined engine lower limit rotation speed as a lower limit, and
wherein, when the predetermined execution condition is satisfied and the engine stop request has not been initiated, the control device,
  i. sets an engine rotation speed by using a vehicle required power required for the vehicle based on an accelerator position and an operation line;
  ii. sets the greater rotation speed between the engine lower limit rotation speed and the set engine rotation speed, and
  iii. causes the engine to be motored at the set greater rotation speed, as the rotation speed limitation control.

6. The hybrid vehicle according to claim 5,
wherein the predetermined execution condition includes at least one of:
  i. a condition that an operation time of the engine that is started along with activation of the vehicle is shorter than a predetermined time period;
  ii. a condition that ambient temperature is lower than a predetermined temperature, and
  iii. a condition that temperature of cooling water or engine oil of the engine is lower than a predetermined temperature.

7. A hybrid vehicle, comprising:
an engine;
a motor generator configured to regenerate power from the engine and to motor the engine; and
a control device configured to control the engine and the motor generator,
wherein the control device performs motoring control that controls the motor generator to cut off fuel supply to the engine and to motor the engine from a state that the engine is operated and
when the engine is to be stopped after the motoring control, the control device causes the engine to be motored at a rotation speed that exceeds a rotation speed range of the engine causing resonance, as the motoring control, and
wherein when a predetermined execution condition is satisfied when an engine stop request is initiated, the control device performs the motoring control and then stops the engine, and
wherein, when the predetermined execution condition is satisfied and the engine stop request has not been initiated, the control device performs regeneration limitation control that controls the motor generator to regenerate power with a predetermined negative motor lower limit torque as a lower limit in load operation of the engine accompanied with regeneration of power by the motor generator, and
wherein when the predetermined execution condition is satisfied and the engine stop request has not been initiated, the control device;
  i. sets a negative torque that is to be output from the motor generator to operate the engine at a target rotation speed,
  ii. sets the greater torque between the motor lower limit torque and the set negative torque; and
  iii. causes the set greater torque to be output from the motor generator, as regeneration limitation control.

8. The hybrid vehicle according to claim 7,
wherein the predetermined execution condition includes at least one of a condition that an operation time of the engine that is started along with activation of the vehicle is shorter than a predetermined time period, a condition that ambient temperature is lower than a predetermined temperature and a condition that temperature of cooling water or engine oil of the engine is lower than a predetermined temperature.

9. The hybrid vehicle according to claim 7,
wherein when the predetermined execution condition is satisfied and the engine stop request has not been initiated, the control device selects and performs at least one of the regeneration limitation control and rotation speed limitation control that controls the engine to be operated at a predetermined rotation speed as a lower limit, and
wherein, when the predetermined execution condition is satisfied and the engine stop request has not been initiated, the control device;

i. sets an engine rotation speed by using a vehicle required power required for a vehicle based on an accelerator position and an operation line;
ii. sets the greater rotation speed between the engine lower limit rotation speed and the set engine rotation speed; and
iii. causes the engine to be motored at the set greater rotation speed, as the rotation speed limitation control.

10. The hybrid vehicle according to claim 9,
wherein the control device performs at least the regeneration limitation control out of the regeneration limitation control and the rotation speed limitation control when the engine is in load operation, while performing the rotation speed limitation control when the engine is not in load operation.

\* \* \* \* \*